United States Patent
Ohta et al.

(10) Patent No.: US 7,195,199 B2
(45) Date of Patent: Mar. 27, 2007

(54) FLAPPING APPARATUS

(75) Inventors: Yoshiji Ohta, Kashiwara (JP); Keita Hara, Kashihara (JP); Masaki Hamamoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 11/107,064

(22) Filed: Apr. 15, 2005

(65) Prior Publication Data

US 2005/0230523 A1  Oct. 20, 2005

Related U.S. Application Data

(62) Division of application No. 10/749,777, filed on Dec. 31, 2003, now Pat. No. 6,926,230.

(30) Foreign Application Priority Data

Jan. 16, 2003 (JP) .............................. 2003-008219
Dec. 11, 2003 (JP) .............................. 2003-413521

(51) Int. Cl.
*B64C 33/00* (2006.01)
(52) U.S. Cl. ........................ 244/22; 244/11; 244/72; 446/35
(58) Field of Classification Search ................. 244/22, 244/72, 11; 446/35
See application file for complete search history.

(56) References Cited

U.S. PATENT DOCUMENTS

| 920,792 | A | 5/1909 | Uherkocz |
| 980,840 | A | 1/1911 | Rozboril et al. |
| 1,525,565 | A | 2/1925 | Bean |
| 1,980,002 | A | 11/1934 | Savidge |
| 2,017,534 | A | 10/1935 | Gray |
| 2,418,569 | A | 4/1947 | Baumann |
| 5,163,861 | A | 11/1992 | Van Ryumbeke |
| 2002/0117583 | A1 | 8/2002 | Hamamoto et al. |

FOREIGN PATENT DOCUMENTS

JP  2002-326599  11/2002

*Primary Examiner*—Tien Dinh
(74) *Attorney, Agent, or Firm*—David G. Conlin; David A. Tucker; Edwards Angell Palmer & Dodge LLP

(57) ABSTRACT

A flapping apparatus includes a first disk rotated by a driving source, and a second disk that rotates in contact with a main surface of the first disk. The second disk is provided with first and second stoppers that limit its angle of rotation. When the stopper is in contact with the first disk, rotation of a wing shaft is caused only by the rotation of the first disk, and when the stoppers are not in contact with the first disk, rotation of the wing shaft is caused only by the rotation of the second disk.

9 Claims, 18 Drawing Sheets

FLAPPING APPARATUS

This is a divisional patent application of U.S. patent application Ser. No. 10/749,777 filed 31 Dec. 2003 now U.S. Pat. No. 6,926,230, by Yoshiji OHTA, Keita HARA, and Masaki HAMAMOTO (the same inventors as of this divisional application), entitled FLAPPING APPARATUS

BACKGROUND OF THE INVENTION

1. Field of the Invention

The present invention relates to a flapping apparatus having a pair of wing portions provided respectively on right and left sides of a body with respect to forward and backward directions.

2. Description of the Background Art

Conventionally, various robots for home use have been developed. A flapping robot that moves by flapping flight comes to be studied widely, as an example of such robots. Various mechanisms have been proposed to have the flapping robot make flapping motion. For instance, a mechanism using an actuator with three degrees of freedom for one wing or a mechanism having two actuators each having one degree of freedom for one wing has been proposed.

The mechanism using an actuator with three degrees of freedom for one wing mentioned above, however, requires a very precise processing accuracy. Therefore, reduction in size of such mechanism is difficult. A mechanism having a plurality of actuators each with one degree of freedom for one wing increases the total weight of the flapping robot. Accordingly, the mechanism requires larger lift for the flapping flight and consumes much power.

Therefore, there is a demand for a flapping mechanism having only one actuator with one degree of freedom used for one wing, which realizes a complicated three-dimensional locus necessary for flapping flight and hovering.

In the conventional flapping robot described above, a mechanism has not been realized in which only one actuator with one degree of freedom is used on one wing and lift is improved by forcefully twisting the wing.

SUMMARY OF THE INVENTION

The present invention was made in view of the problems described above, and an object is to provide a flapping apparatus that can realize a complicated three-dimensional locus of a wing necessary for flapping flight and hovering, using only one actuator with one degree of freedom on one wing.

Another object of the present invention is to provide a flapping apparatus realizing a mechanism for improving lift, by forcefully twisting the wing, using only one actuator with one degree of freedom on one wing.

According to one aspect, the flapping apparatus of the present invention has a body, and a pair of wing portions provided respectively on left and right sides of the body with respect to the forward and backward directions. The wing portions of the flapping apparatus generate, by motions thereof, fluid force on the surrounding fluid. The fluid force can generate, on the flapping apparatus, a lift force larger than gravity of the flapping apparatus in a direction opposite to the gravity of the flapping apparatus.

The flapping apparatus further includes a wing shaft having one end fixed on the wing portion and the other end attached to the body, for transmitting driving force of a driving source to the wing portion. The flapping apparatus further includes a rotating member (hereinafter referred to as a central point rotating member) that can rotate the wing shaft about a prescribed central point along a plane parallel to a plane including the forward and backward direction and the left and right direction orthogonal to the forward and backward direction.

The flapping apparatus further includes another rotating member (hereinafter referred to as a wing shaft rotating member) that follows the rotation of the wing shaft about the prescribed central point without using any driving force from a driving source and rotates the wing shaft about a central axis of rotation parallel to the direction of extension of the wing shaft. The flapping apparatus includes a stopper limiting the range of rotation of the wing shaft rotating member so that the rotation angle of the wing shaft is limited within a prescribed range.

When the stopper is functioning, the wing shaft rotating member has its positional relation relative to the central point rotating member fixed, and therefore, rotation of the wing shaft is caused by the rotation of the central point rotating member. When the stopper is not functioning, the wing shaft rotating member rotates as the central point rotating member rotates, and therefore, rotation of the wing shaft is caused by the rotation of the wing shaft rotating member.

Because of the structure described above, it becomes possible to realize a complicated three-dimensional locus of the wing necessary for flapping flight and hovering, simply by providing one driving source having one degree of freedom on one wing.

Preferably, the stopper is provided on at least one of the central point rotating member and the wing shaft rotating member. Thus, it becomes possible to realize a complicated three-dimensional locus of the wing necessary for flapping flight and hovering, by a stopper having a simple structure.

Preferably, the stopper stops the rotation of the wing shaft rotating member as it abuts either one of the wing shaft rotating member and the central point rotating member. The coefficient of friction of the stopper and the coefficient of friction of either one of the central point rotating member and the wing shaft rotating member is set such that positional relation between the stopper and one of the central point rotating member and the wing shaft rotating member does not change while the stopper is in abutment with either the central point rotating member or the wing shaft rotating member.

Because of the above described structure, undesirable change in the positional relation between the central point rotating member and the wing shaft rotating member can be prevented.

Preferably, the central point rotating member includes a first disk, and the wing shaft rotating member includes second and third disks. Preferably, the second and third disks are provided to have the same central axis of rotation, and when the stopper is not functioning, the second and third disks preferably rotate as the first disk rotates, with the outer circumferential surfaces of the second and third disks being in contact with a main surface of the first disk. Further, preferably, the wing shaft is fixed on the second disk, and when the stopper is not functioning, the wing shaft rotates as the second disk rotates. Preferably, the wing shaft passes through a through hole of the third disk, and when the stopper is not functioning, the wing shaft rotates being in contact with the through hole.

Because of the structure described above, the central point rotating member and the wing shaft rotating member can be manufactured from simple structure such as disk shaped members that can be readily formed.

Preferably, the flapping apparatus described above further includes a fourth disk having a main surface opposed to the main surface of the first disk and being in contact with the outer circumferential surface of the second disk. Preferably, the central axis of rotation of the fourth disk is coaxial with the central axis of rotation of the first disk, and the fourth disk rotates following the rotation of the second disk.

Because of the structure described above, the fourth disk presses the second disk, and therefore, undesirable change in the force of the first disk pressing the second disk caused by positional deviation of the first disk can be prevented.

Preferably, the flapping apparatus described above is structured such that frictional force generated between the main surface of the first disk and the outer circumferential surface of the second disk is larger than the frictional force generated between portions other than the main surface of the first disk and the wing shaft.

Because of the structure described above, undesirable deviation in positional relation between the main surface of the first disk and the outer circumferential surface of the second disk caused by a factor other than the movement of the second disk derived from the rotation of the second disk can be prevented.

Further, preferably, the main surface of the first disk and the outer circumferential surface of the second disk have recesses and protrusions that mate with each other. By this provision, undesirable deviation in positional relation between the main surface of the first disk and the outer circumferential surface of the second disk caused by a factor other than the movement of the second disk derived from the rotation of the second disk can surely be prevented.

According to another aspect, a flapping apparatus of the present invention has a body and a pair of wing portions provided on left and right sides of the body with respect to the forward and backward directions. The wing portions of the flapping apparatus generate, by motions thereof, fluid force in the surrounding fluid. The fluid force can generate, on the flapping apparatus, a lift force larger than gravity of the flapping apparatus in a direction opposite to the gravity of the flapping apparatus.

The flapping apparatus further includes a first wing shaft having one end fixed on the wing portion and the other end attached to the body, for transmitting driving force of a driving source to the wing portion. Further, the flapping apparatus further includes a second wing shaft having one end fixed on the wing portion and the other end attached to the body, for transmitting driving force of a driving source to the wing portion.

The flapping apparatus further includes a central point rotating member that can rotate the first wing shaft about a prescribed central point along a plane parallel to a plane including the forward and backward direction and the left and right direction orthogonal to the forward and backward direction. Further, the flapping apparatus includes a wing shaft rotating member that follows the rotation of the first wing shaft about the prescribed central point without using any driving force from a driving force and rotates the second wing shaft about a central axis of rotation crossing the first wing shaft at a prescribed angle.

Further, the wing portion is provided spanning between the first and second wing shafts, and the relative change in the positional relation between the first and second wing shafts forces the wing portion to be twisted.

Because of the above described structure, the wing portion is forcefully twisted, and therefore, it becomes possible to twist the wing positively in a flapping motion. Accordingly, it becomes easier for the flapping apparatus to attain higher lift. Thus, a flapping apparatus can be provided that can attain higher lift using only one actuator having one degree of freedom on one wing.

Preferably, the central point rotating member described above includes a disk, and the wing shaft rotating member described above includes a truncated cone, that is a portion of a first cone from which a second cone extending from the vertex of the first cone to a prescribed distance is removed. The truncated cone preferably rotates as the disk rotates, with its circumferential surface being in contact with the main surface of the disk. Preferably, the second wing shaft is provided on a circular surface of the truncated cone. Further, it is preferred that an axis passing through the center of the circular surface of the truncated cone forms a prescribed angle with the second wing shaft.

Because of the structure described above, it becomes possible to form the central point rotating member and the wing shaft rotating member using disk shaped and frustconical members that can be formed relatively easily.

Further, preferably, the main surface of the disk and the outer circumferential surface of the truncated cone have recesses and protrusions that mate with each other. By this provision, undesirable deviation in positional relation between the main surface of the disk and the outer circumferential surface of the truncated cone caused by a factor other than the movement of the truncated cone derived from the rotation of the truncated cone can surely be prevented.

Preferably, the flapping apparatus further includes a stopper limiting the range of rotation of the wing shaft rotating member so that the rotation angle of the second wing shaft is limited within a prescribed range. When the stopper is functioning, the wing shaft rotating member has its positional relation relative to the central point rotating member fixed, and therefore, rotation of the first and second wing shafts is caused by the rotation of the central point rotating member. When the stopper is not functioning, the wing shaft rotating member rotates as the central point rotating member rotates, and therefore, and rotation of the second wing shaft is caused by the rotation of the wing shaft rotating member.

Because of the structure described above, it becomes possible to realize a complicated three-dimensional locus of the wing necessary for flapping flight and hovering, simply by providing one actuator having one degree of freedom on one wing.

Preferably, the stopper is provided on at least one of the central point rotating member and the wing shaft rotating member. Thus, it becomes possible to realize a complicated three-dimensional locus of the wing necessary for flapping flight and hovering, by a stopper having a simple structure.

Preferably, the stopper stops the rotation of the wing shaft rotating member as it abuts either one of the wing shaft rotating member and the central point rotating member. The coefficient of friction of the stopper and the coefficient of friction of either one of the central point rotating member and the wing shaft rotating member is set such that positional relation between the stopper and one of the central point rotating member and the wing shaft rotating member does not change while the stopper is in abutment with either the central point rotating member or the wing shaft rotating member.

Because of the above described structure, undesirable change in the positional relation between the central point rotating member and the wing shaft rotating member can be prevented.

Preferably, the flapping apparatus further includes a wing edge having a flexible wire provided to connect a tip end of the first wing shaft and a tip end of the second wing shaft.

Preferably, the wing portion is formed at a portion surrounded by the first wing shaft, the second wing shaft and the wing edge.

Preferably, the wing edge is formed of a member having such flexibility that does not cause plastic deformation when the relative positional relation between the first and second wing shafts changes. This prevents damage to the wing edge caused by continuous flapping flight.

Preferably, the first and second wing shafts are formed by hollow cylindrical members. Preferably, the wing edge is inserted into the hollow portions of the cylindrical members, it can rotate about each of axes extending in the directions of extension of each of the first and second wing shafts, in each of the hollow portions, and the wing edge is provided not to come off from each of the first and second wing shafts. Because of this provision, the wing edge is twisted not restricted by the first and second wing shafts during flapping flight, and hence, damage to the wing edge caused by continuous flapping flight can be prevented.

According to a further aspect, the flapping apparatus of the present invention has a body, and a pair of wing portions provided respectively on left and right sides of the body with respect to the forward and backward directions.

The flapping apparatus further includes a wing shaft having one end fixed on the wing portion and the other end attached to the body, for transmitting driving force of a driving source to the wing portion, and a central point rotating mechanism that can rotate the wing shaft about a prescribed central point along a plane parallel to a plane including the forward and backward direction and the left and right direction orthogonal to the forward and backward direction. The flapping apparatus further includes a wing shaft rotating mechanism that follows the rotation of the wing shaft about the prescribed central point without using any driving force from a driving source and rotates the wing shaft about a central axis of rotation parallel to the direction of extension of the wing shaft.

The wing portions generate, by the rotation of the wing shaft about the central axis of rotation, fluid force on the surrounding fluid. The fluid force can generate, on the flapping apparatus, a lift force larger than gravity of the flapping apparatus in a direction opposite to the gravity of the flapping apparatus.

Because of the structure described above, rotation of the wing shaft about the central axis of rotation is attained by the wing shaft rotating mechanism, following the rotation of the wing shaft about the prescribed central point attained by the central point rotating mechanism. Therefore, movement of the wing portion with two degrees of freedom can be attained with the driving source driving only the central point rotating mechanism and not driving the wing shaft rotating mechanism. In other words, a flapping apparatus is provided that can hover simply by the driving of an actuator with one degree of freedom on one wing, that is, the central point rotating mechanism, because of the structure described above.

Preferably, the flapping apparatus of the present invention further includes an amplitude center moving mechanism that can move the center of amplitude of the rotation of the wing shaft about the prescribed central point, along a plane including the forward and backward as well as the left and right directions.

Because of this structure, by moving the center of amplitude of rotation of the wing shaft about the prescribed central point, not only hovering but also movement in any of forward, backward, left and right directions become possible.

Preferably, in the flapping apparatus of the present invention, the amplitude center moving mechanism can move the center of amplitude while the central point rotating mechanism is rotating the wing shaft.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The flapping apparatus in accordance with the present embodiment will be described in detail with reference to the figures.

Figure 1:
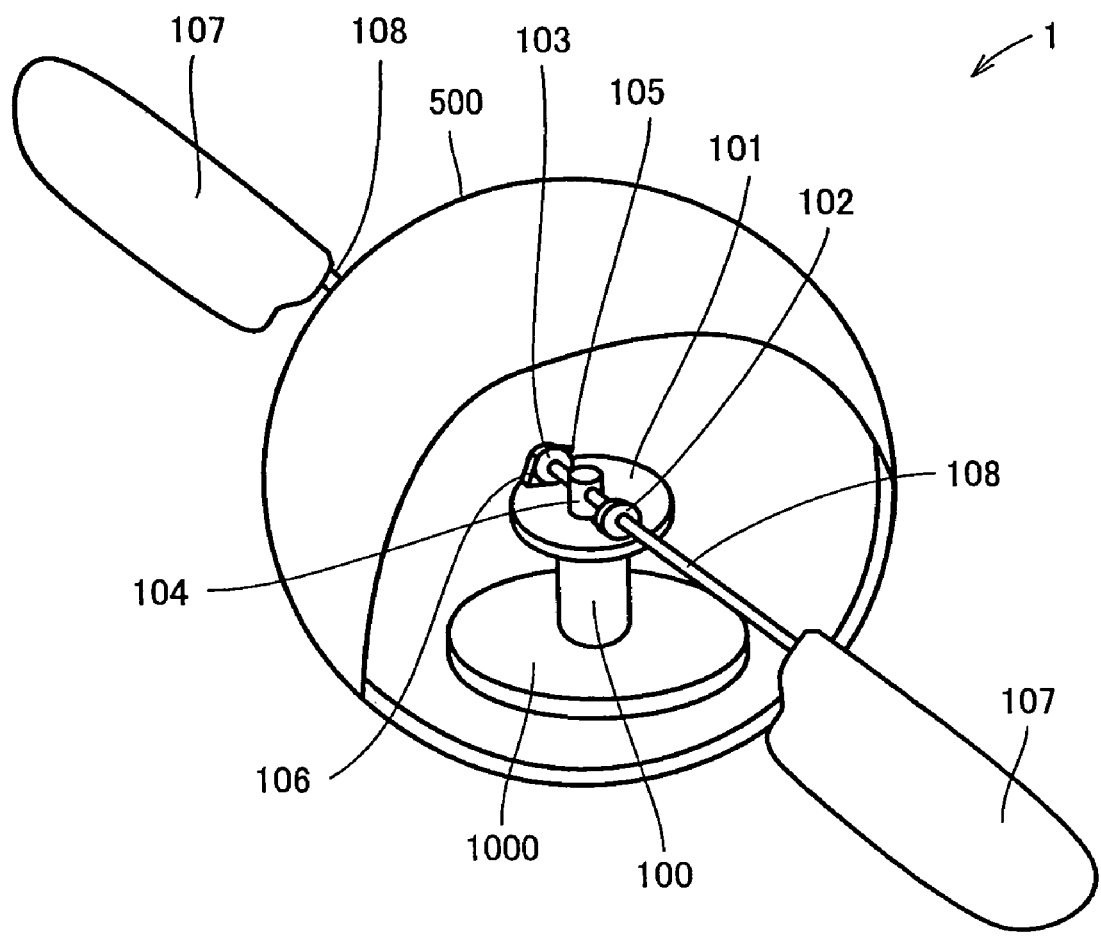
FIG. 1 represents a flapping apparatus in accordance with a first embodiment.
Figure 1:
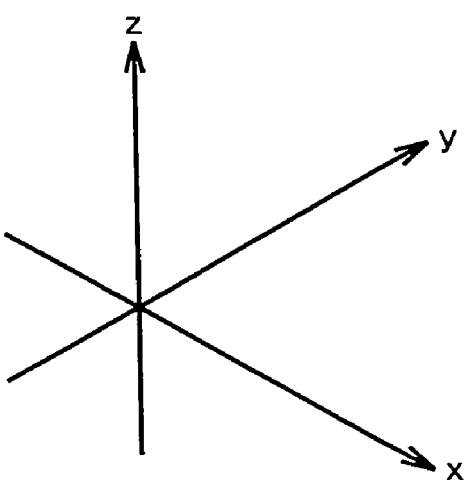
Figure 17:
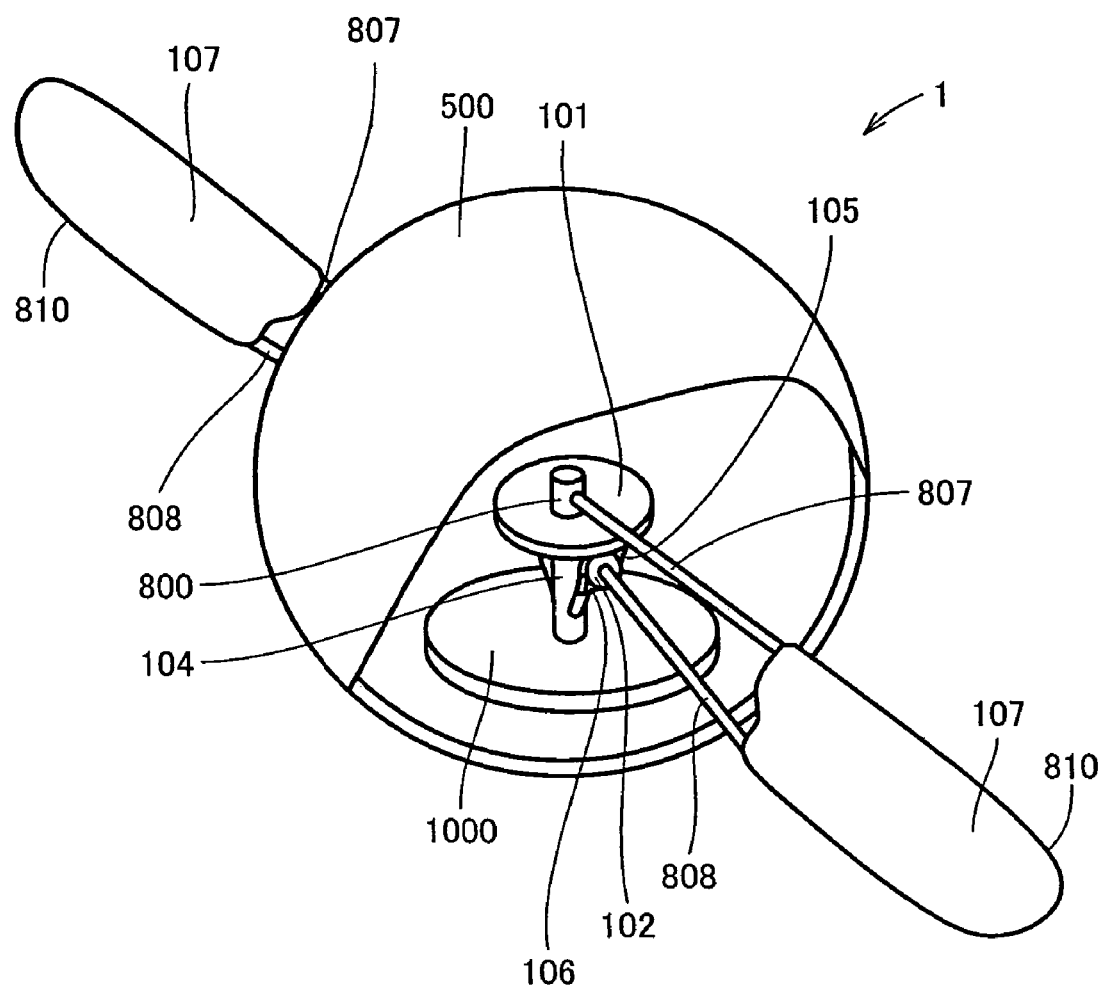
FIG. 17 represents a flapping apparatus in accordance with a second embodiment.
Figure 17:
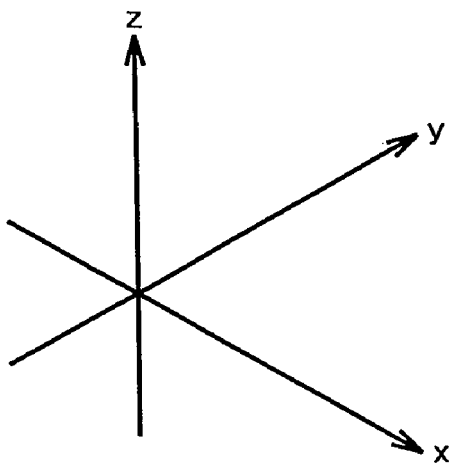

Main components of the overall flapping apparatuses in accordance with the first and second embodiments are shown in FIGS. 1 and 17. In the flapping apparatuses of these embodiments, it is assumed that the main portions driving the wings are in mirror symmetry in left and right directions unless specified otherwise, for convenience of description. In each embodiment, only the right half of the flapping apparatus will be described. Description of a control unit controlling the driving source, of an antenna to which external information is input and of a sensor will not be given here.

For each embodiment, description will be given assuming that the components on the right half are in mirror symmetry with the left half. In the flapping apparatus of the present invention, however, mirror symmetry is not an essential condition. In FIGS. 1 and 17, the vertical direction will be represented by the z axis, the forward/backward direction is represented by the y axis, and the left/right direction is represented by the x axis.

(First Embodiment)

First, a flapping apparatus 1 as an embodiment of the present invention will be described.

Flapping apparatus 1 in accordance with the present embodiment has, as shown in FIG. 1, a body 500 and a pair of wings 107 provided on the left and right sides with respect to the forward and backward directions on the body 500. The wings 107 of flapping apparatus 1 generate, by their motion, fluid force in the surrounding fluid. The fluid force can generate, on the flapping apparatus 1, a lift force larger than gravity of the flapping apparatus 1 in a direction opposite to the gravity of the flapping apparatus 1.

The flapping apparatus 1 includes a wing shaft 108 having one end fixed on the wing 107 and the other end attached to the body 500, for transmitting driving force of a driving source 1000 to the wing 107. The flapping apparatus 1 further includes a first disk 101 as a central point rotating member that rotates the wing shaft 108 about a prescribed central point (central point of first disk 101) along a plane parallel to the plane xy including the left/right direction orthogonal to the forward and backward direction.

The flapping apparatus further includes a second disk 102 as a wing shaft rotating member that follows the rotation of the wing shaft 108 about the prescribed central point without using any driving force from driving source 1000 and rotates the wing shaft 108 about a central axis of rotation parallel to the direction of extension of the wing shaft 108. The flapping apparatus 1 includes a first stopper 105 and a second stopper 106 limiting the range of rotation of second disk 102 so that the rotation angle of the wing 107 is limited within a prescribed range.

When first stopper 105 or second stopper 106 is functioning, second disk 102 has its positional relation relative to the first disk 101 fixed, and therefore, rotation of wing shaft 108 is caused by the rotation of the first disk 101. When the first and second stoppers 105 and 106 are not functioning, second disk 102 rotates as the first disk 101 rotates, and therefore, rotation of wing shaft 108 is caused by the rotation of the second disk 102.

Because of the structure described above, it becomes possible to realize a complicated three-dimensional locus of wing 107 necessary for flapping flight and hovering, simply by providing one driving source 1000 having one degree of freedom on one wing 107.

Preferably, the stopper is provided on at least one of the first and second disks 101 and 102. Thus, excessive rotation of second disk 102 can be prevented by a stopper of a simple structure.

The stopper described above abuts one of the first and second disks 101 and 102, to stop rotation of the second disk 102. The coefficient of friction of the stopper and the coefficient of friction of either one of the first and second disks 101 and 102 is set such that positional relation between the stopper 105 or 106 and one of the first and second disks 101 and 102 does not change while the stopper is in abutment with either the first disk 101 or the second disk 102.

Because of the above described structure, undesirable change in the positional relation between the first and second disks 101 and 102 can be prevented.

Flapping apparatus 1 further includes a third disk 103. The second and third disks 102 and 103 are provided to have the same central axis of rotation, and when the first and second stoppers 105 and 106 are not functioning, the second and third disks 102 and 103 rotate as the first disk 101 rotates, with the outer circumferential surfaces of the second and third disks 102 and 103 being in contact with a main surface of the first disk 101. Further, preferably, the wing shaft 108 is fixed on the second disk 102, and when the stoppers 105, 106 are not functioning, the wing shaft 108 rotates as the second disk 102 rotates. Further, the wing shaft 108 passes through a through hole of the third disk 103, and when the stoppers 105 and 106 are not functioning, the wing shaft 108 rotates being in contact with the through hole.

Because of the structure described above, the central point rotating member and the wing shaft rotating member can be manufactured from simple, disk shaped members that can be readily formed.

Figure 16:
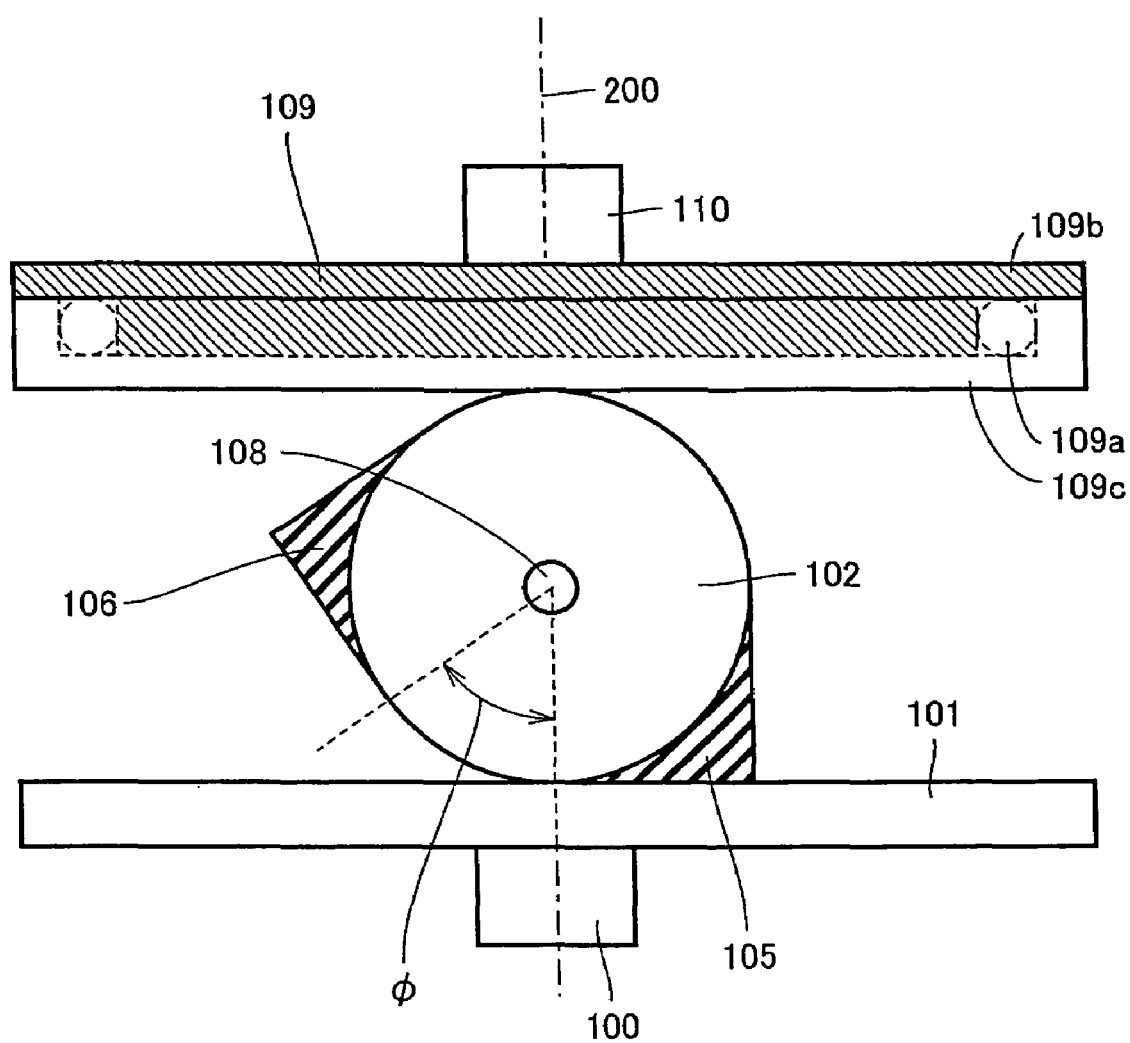

The above described flapping apparatus 1 further includes, as shown in FIG. 16, a fourth disk 109 having a main surface opposed to the main surface of the first disk 101 and being in contact with the outer circumferential surface of the second disk 102. The central axis of rotation of the fourth disk 109 is coaxial with the central axis of rotation of the first disk 101, and the fourth disk 109 rotates following the rotation of the second disk 102.

Because of the structure described above, the fourth disk 109 presses the second disk 102, and therefore, undesirable change in the force of the first disk 101 pressing the second disk 102 caused by positional deviation of the first disk 101 can be prevented.

Preferably, the flapping apparatus 1 described above is structured such that frictional force generated between the main surface of the first disk 101 and the outer circumferential surface of the second disk 102 is larger than the frictional force generated between portions other than the main surface of the first disk 101, such as a support shaft 104 and the third disk 103, and the wing 107.

Because of the structure described above, undesirable deviation in positional relation between the main surface of the first disk 101 and the outer circumferential surface of the second disk 102 caused by a factor other than the movement of the second disk 102 derived from the rotation of the second disk 102 can be prevented.

Further, the main surface of the first disk 101 and the outer circumferential surface of the second disk 102 may have recesses and protrusions that mate with each other. By this provision, undesirable deviation in positional relation between the main surface of the first disk 101 and the outer circumferential surface of the second disk 102 caused by a factor other than the movement of the second disk 102 derived from the rotation of the second disk 102 can surely be prevented.

In the following, flapping apparatus 1 in accordance with the present embodiment will be described in detail.

Figure 2:
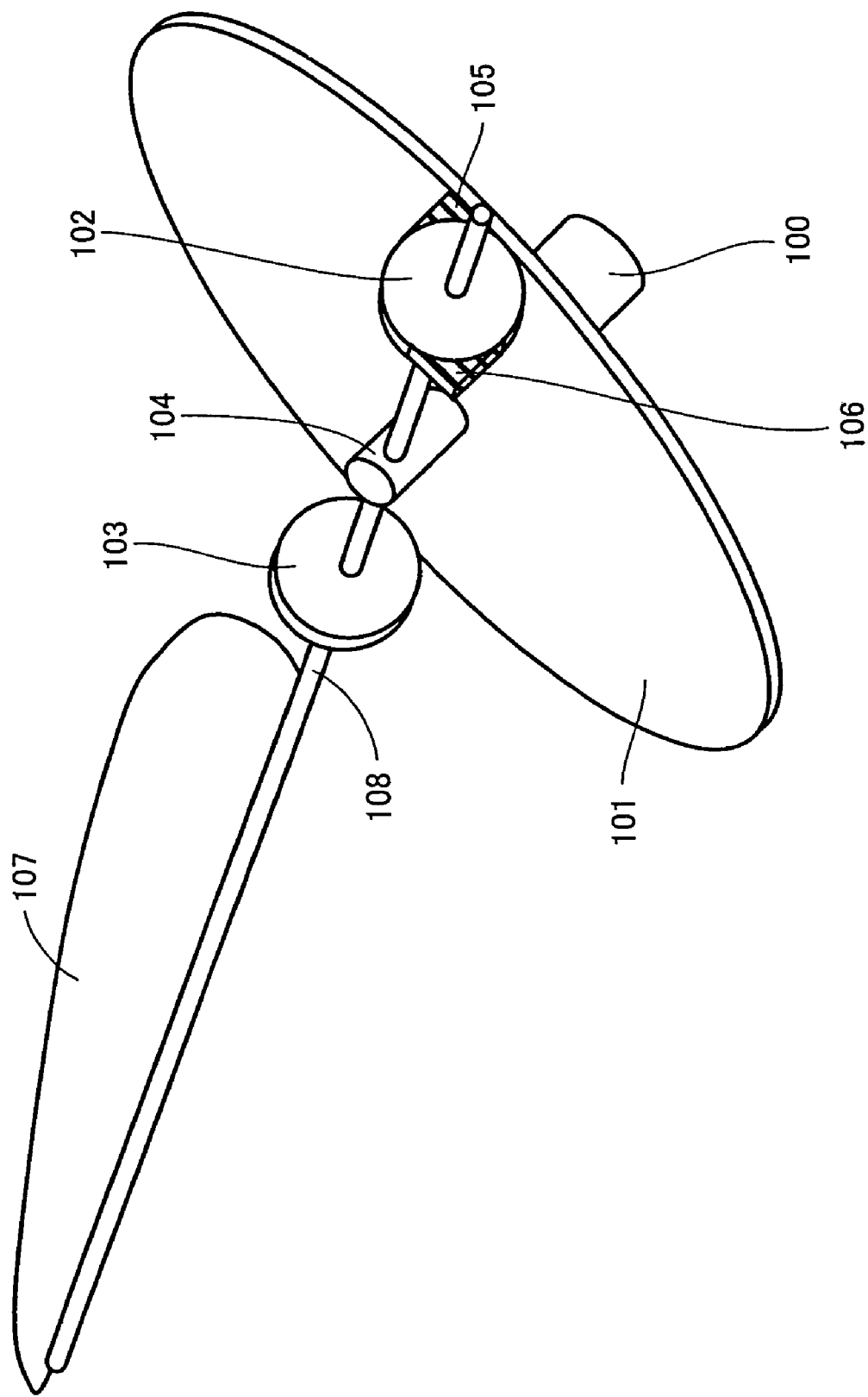
FIG. 2 represents a mechanical portion for flapping of the flapping apparatus shown in FIG. 1.
Figure 3:
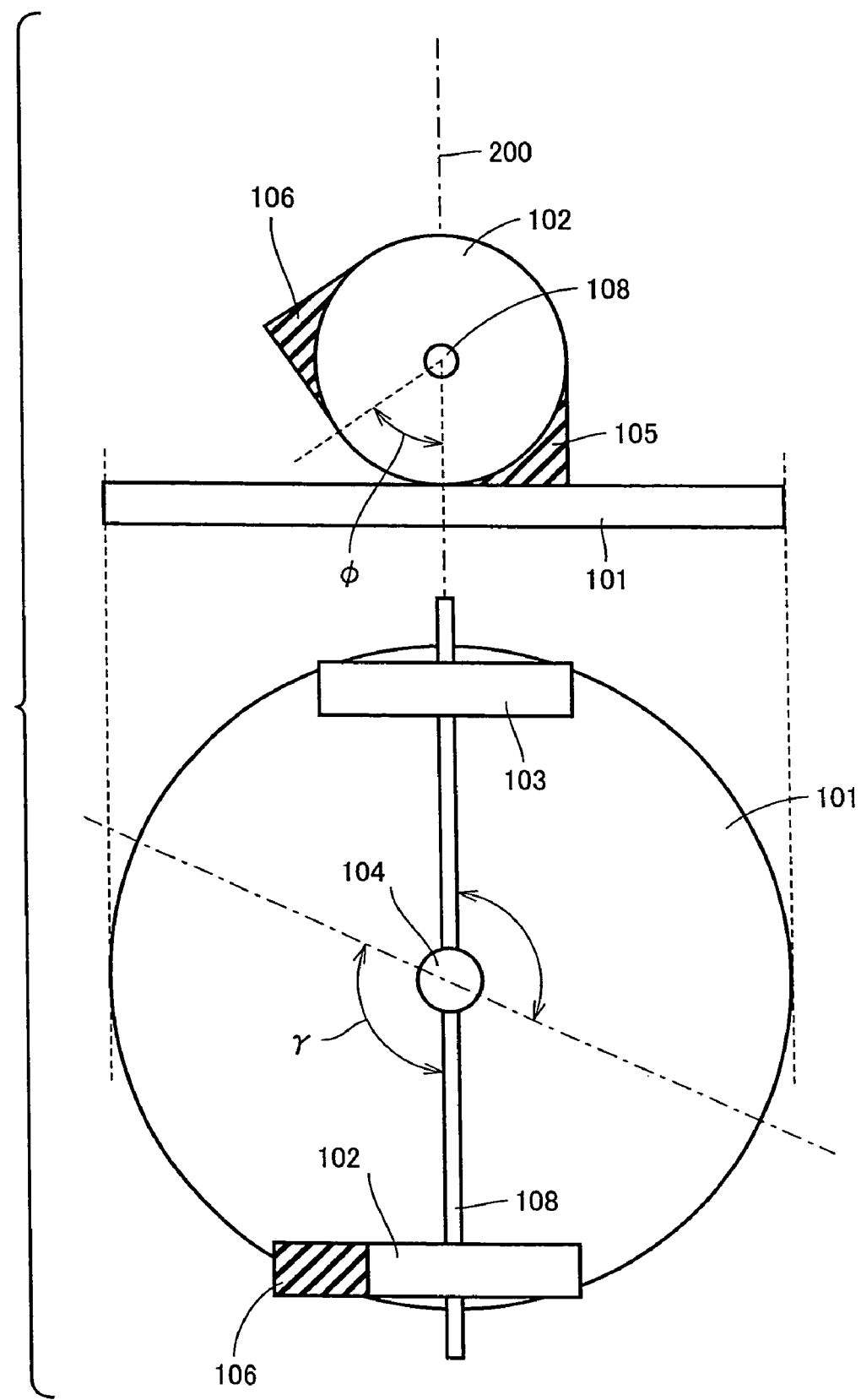
FIG. 3 is an enlarged view of the mechanical portion for flapping of the flapping apparatus shown in FIG. 1.

FIG. 2 is a schematic illustration of a flapping mechanism of the flapping apparatus in accordance with the first embodiment. FIG. 3 shows, in enlargement, the first and second disks 101 and 102 of FIG. 1. In FIG. 3, (A) shows the flapping mechanism viewed from the direction of extension of wing shaft 108, and (B) shows the flapping mechanism viewed from the direction of extension of a support shaft 104.

The flapping apparatus of the present embodiment will be described first with reference to FIGS. 1 to 3.

As can be seen from FIGS. 1 to 3, flapping apparatus 1 in accordance with the present embodiment has a transmission shaft 100. Transmission shaft 100 is a rotation shaft for transmitting rotational force from a driving source 1000 such as an actuator to the first disk 101. Transmission shaft 100 is fixed to the first disk 101. Therefore, the first disk 101 rotates as transmission shaft 100 rotates.

With the main surface of first disk 101, outer circumferential surfaces of the second and third disks 102 and 103 are in contact, respectively. Wing shaft 108 extends along the central axis of rotation of the second and third disks 102 and 103. Wing shaft 108 passes through support shaft 104 that is rotatably inserted into the central portion of the first disk 101. Further, wing shaft 108 is fixed to a leading edge of wing 107.

Support shaft 104 is inserted into a columnar concave provided on first disk 101 and transmission shaft 100 is formed such that it can rotate about a central axis that is the same as the axis of rotation 200 of the first disk 100, but independent from the first disk 101. Therefore, even when the first disk 101 rotates, the rotation of support shaft 104 is not caused by the rotation of first disk 101.

Wing shaft 108 is fixed on the second disk 102. Further, wing shaft 108 rotatably passes through the third disk 103 and support shaft 104. Therefore, wing shaft 108 can rotate about a central axis of rotation extending in the direction of extension of wing shaft 108, not restricted by the states of the third disk 103 and support shaft 104.

Further, the second disk 102 is provided with first and second stoppers 105 and 106. The first and second stoppers 105 and 106 limit the rotation of the second disk 102 so that the angle of rotation of the second disk 102 is within a prescribed range.

Contact surfaces between the first and second disks 101 and 102, between the first and third disks 101 and 103 and between either one of the first and second stoppers 105 and 106 and the first disk 101 respectively have sufficient coefficients of friction. Therefore, slip or skid between the first and second disks 101 and 102, between the first and third disks 101 and 103 and between either one of the first and second stoppers 105 and 106 and the first disk 101 respectively is prevented.

For instance, when the contact surfaces mentioned above are each formed of rubber, slip between the contact surfaces can be prevented. Further, force exerted on support shaft 104 may be applied through wing shaft 108 to the contact surfaces. This brings the contact surfaces into tighter contact, and hence, friction at the contact surfaces becomes higher, more reliably preventing any slip at the contact surfaces. The contact surfaces may be formed to have recesses and protrusions, like gears. In that case, as the recesses and protrusions of the contact surfaces mate with each other, any slip at the contact surface can be prevented.

The flapping motion of the flapping apparatus in accordance with the present embodiment will be described with reference to FIGS. 4 to 11.

Figure 4:
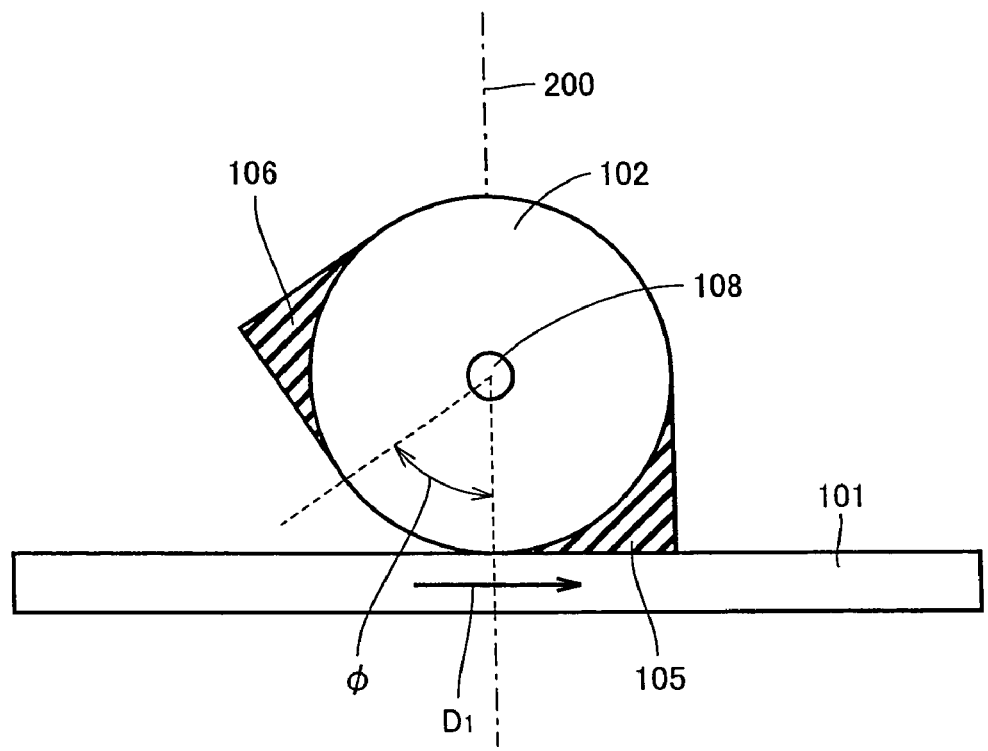
FIGS. 4 to 7 are side views representing the state of motion of the mechanical portion of the flapping apparatus shown in FIGS. 1 to 3.

FIG. 4 shows a state in which the first stopper 105 is in contact with the first disk 101. This is the state immediately after the first disk 101 starts rotation to the right. When the first disk 101 rotates about the central axis of rotation 200, wing shaft 108 tends to rotate by a torsion angle φ. At this time, first frictional force generates between the wing shaft 108 and the third disk 103 and between wing shaft 108 and support shaft 104, and second frictional force generates between the first disk 101 and the second disk 102. At this time, if the first frictional force is sufficiently smaller than the second frictional force, the second disk 102 would rotate by the torsion angle φ shown in FIG. 4 about the axis of rotation of wing shaft 108, that is, rotate in the direction of the arrow $D_7$ of FIG. 8, as the first disk 101 rotates in the direction of the arrow $D_1$.

Figure 8:
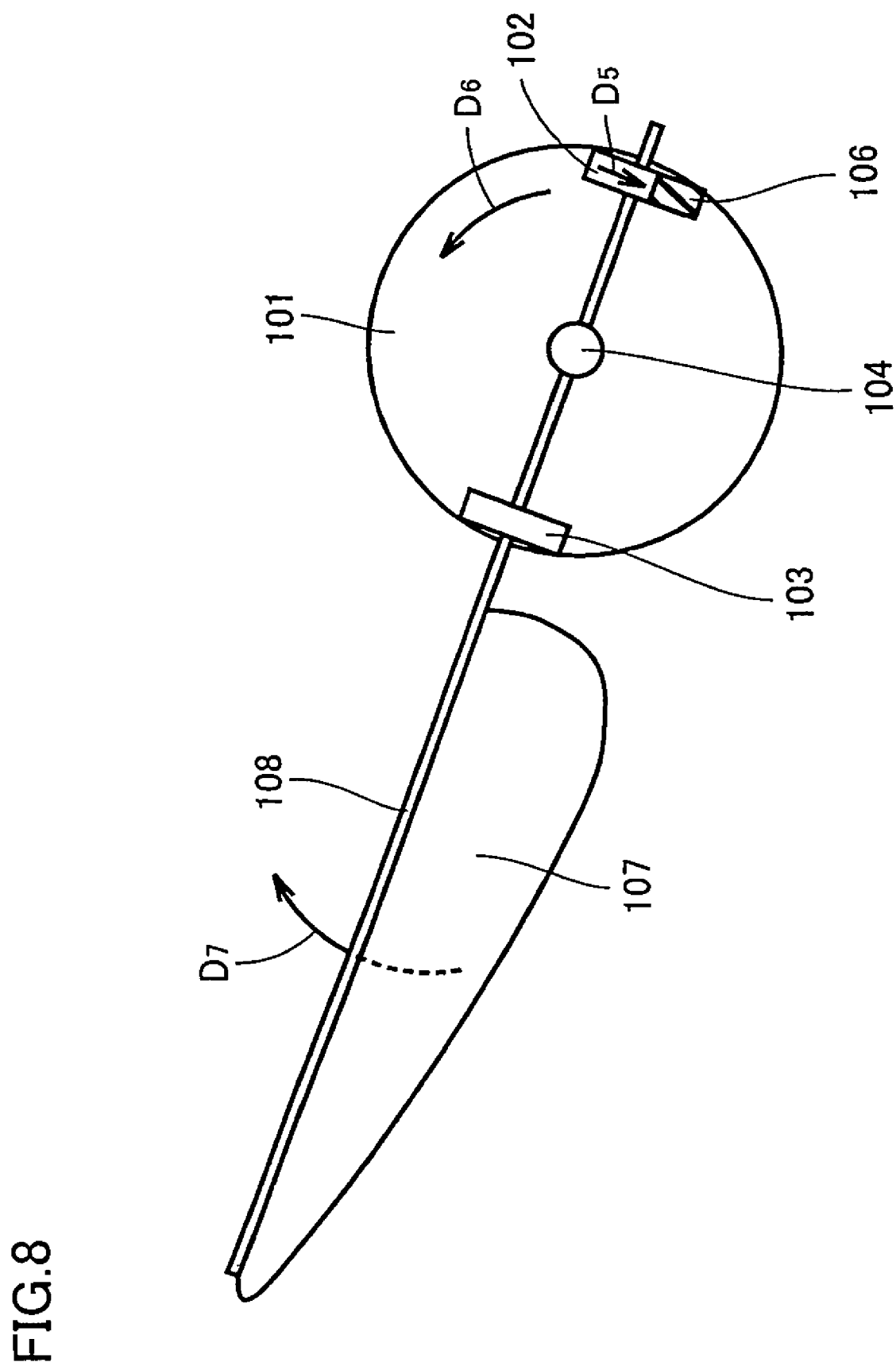
FIGS. 8 to 11 are top views representing the state of motion of the mechanical portion of the flapping apparatus shown in FIGS. 1 to 3.

FIG. 4 shows the flapping mechanism viewed from the direction of extension of wing shaft 108, and FIG. 8 shows the flapping mechanism viewed from the direction of extension of the central axis of rotation 200 of the first disk 101. Here, wing shaft 108 rotates about a central axis of rotation thereof while its position is unchanged, and therefore, wing 107 fixed on wing shaft 108 rotates about the axis of rotation of wing shaft 108 by the torsion angle φ shown in FIG. 4.

Figure 5:
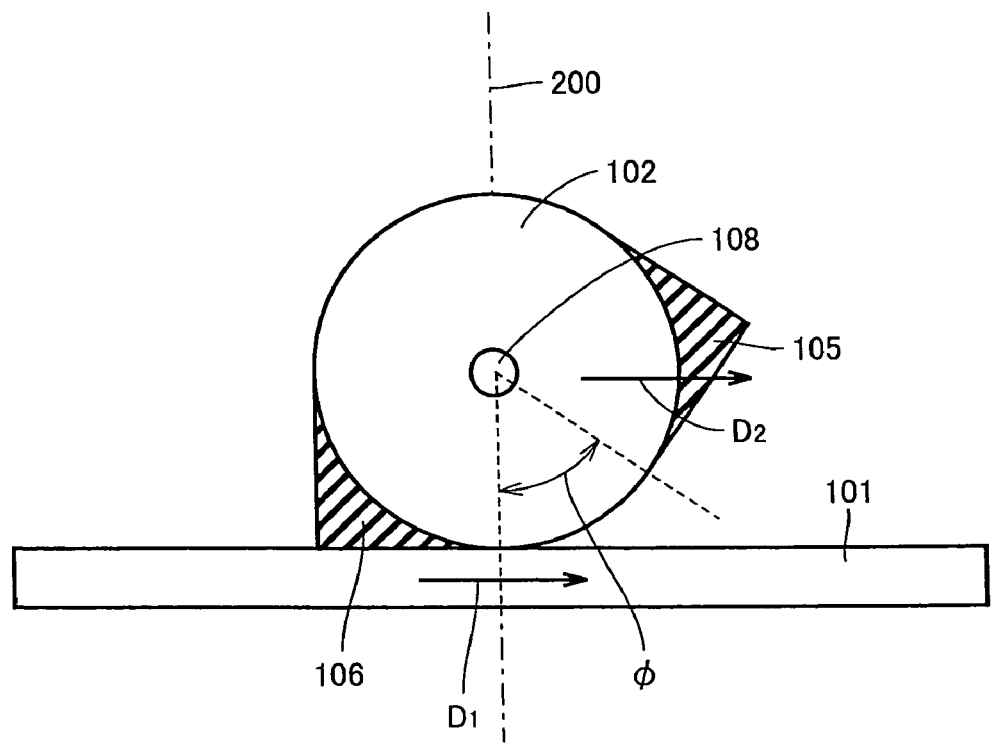
Figure 9:
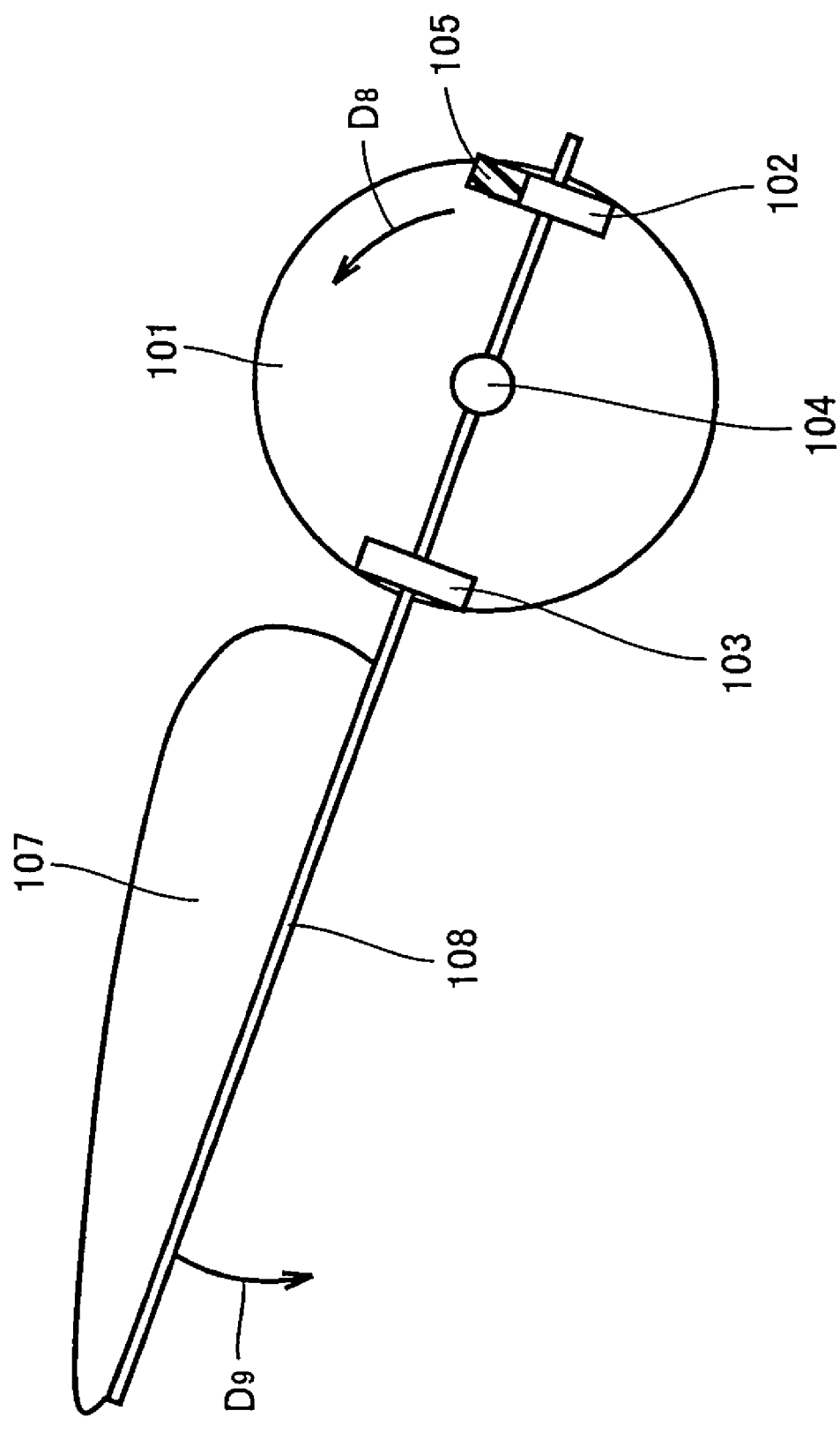

FIG. 5 shows a state immediately after the second disk 102 rotated by torsion angle φ. FIG. 5 shows a state of the flapping mechanism viewed from the direction of extension of wing shaft 108, and FIG. 9 shows the state of the flapping mechanism viewed from the direction of extension of central axis of rotation of the first disk 101.

Here, the first disk 101 abuts the second stopper 106. Thus, rotation of the second disk 102 is stopped. As further rotation of the second disk 102 about the axis of rotation of wing shaft 108 is impossible, it rotates about the central axis of rotation 200 of the first disk 101 as the first disk 101 rotates. The direction of this rotation is represented by the arrow $D_2$ in FIG. 5.

At this time, wing 107 does not rotate about an axis parallel to the direction of extension of the wing shaft 108. Further, wing shaft 108 starts rotation in the direction shown by the arrow $D_9$ of FIG. 9 along with the movement of the second disk 102, caused by the rotation of the first disk 101 in the direction shown by the arrow $D_8$ of FIG. 9.

Figure 6:
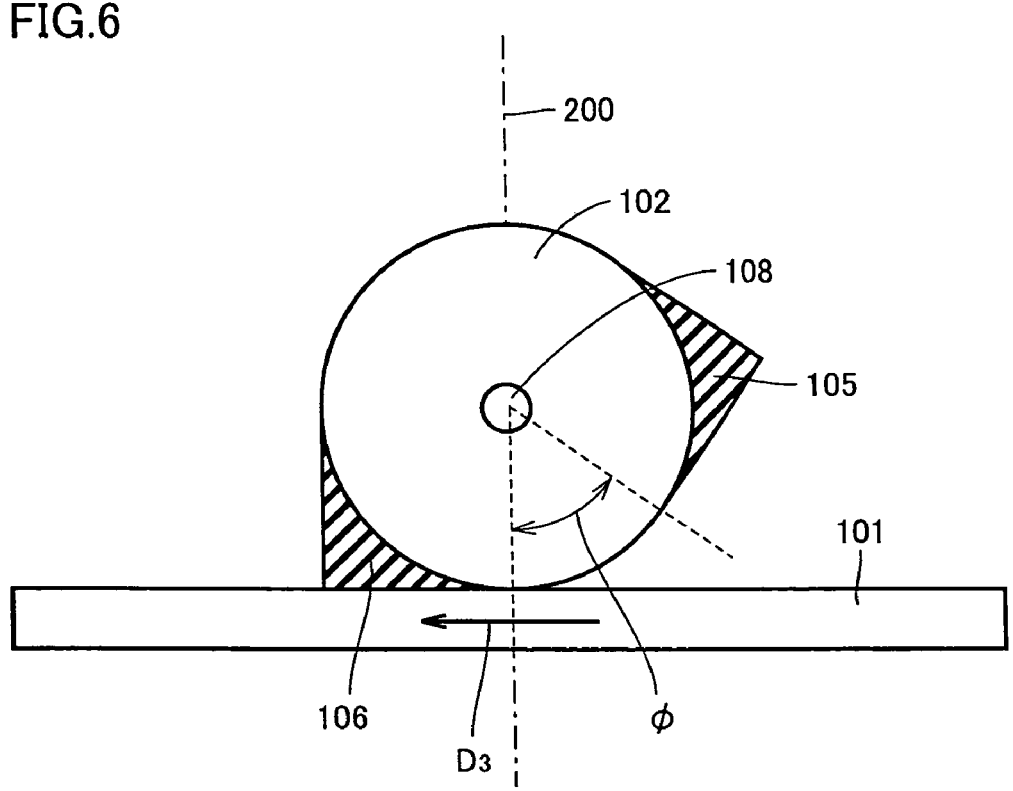

FIG. 6 shows a state immediately after the first disk 101 rotated the second disk 102 by a flapping angle γ shown in FIG. 3 and started rotation in the opposite direction. Here, the first disk 101 starts rotation about the central axis of rotation 200 in the direction shown by the arrow $D_3$ of FIG. 6, that is, the direction shown by the arrow $D_{10}$ in FIG. 10. Accordingly, wing 107 starts rotation about the axis of rotation of wing shaft 108 that is the direction shown by the arrow $D_{11}$ of FIG. 10. This operation stops when the first stopper abuts the first disk 101.

Figure 7:
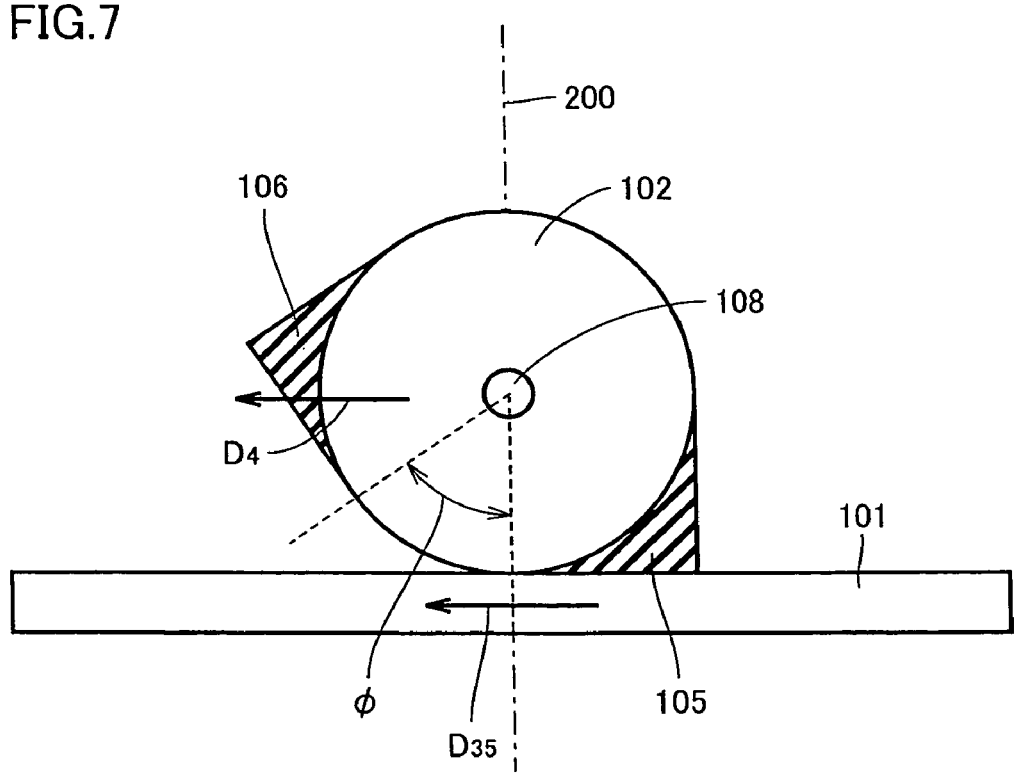
Figure 11:
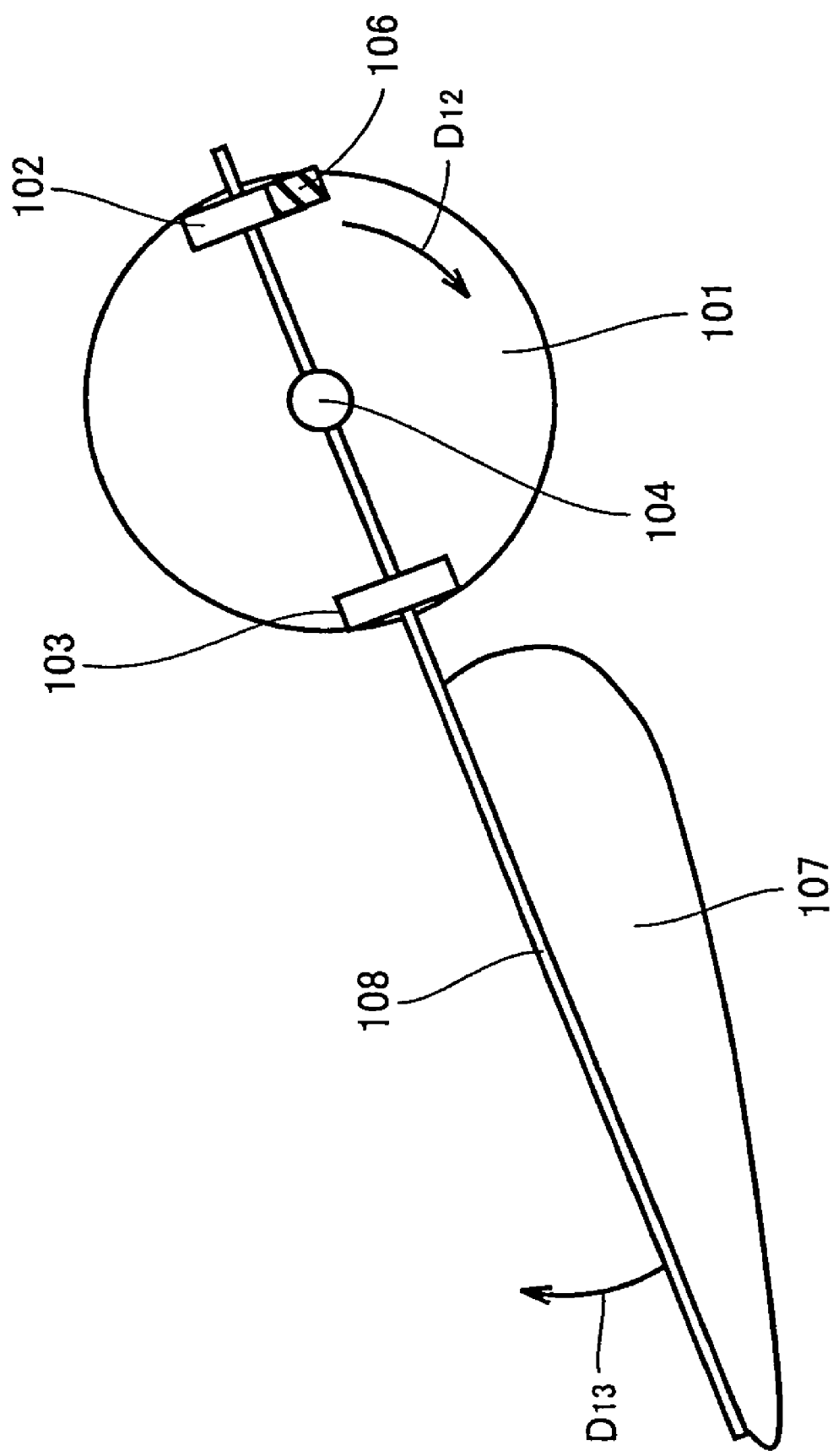

FIG. 7 shows a state in which rotation of the second disk 102 is stopped as the first stopper 105 abuts the first disk 101. As can be seen from FIG. 7, the first disk 101 starts rotation in the direction shown by the arrow $D_{35}$ about the central axis of rotation 200, that is, the direction shown by the arrow $D_{12}$ of FIG. 11. At this time, as shown in FIG. 11, wing shaft 108 starts rotation in the direction of the arrow $D_{13}$, as the first disk 101 rotates. Thus, the flapping mechanism resumes the state shown in FIGS. 4 and 8.

Figure 10:
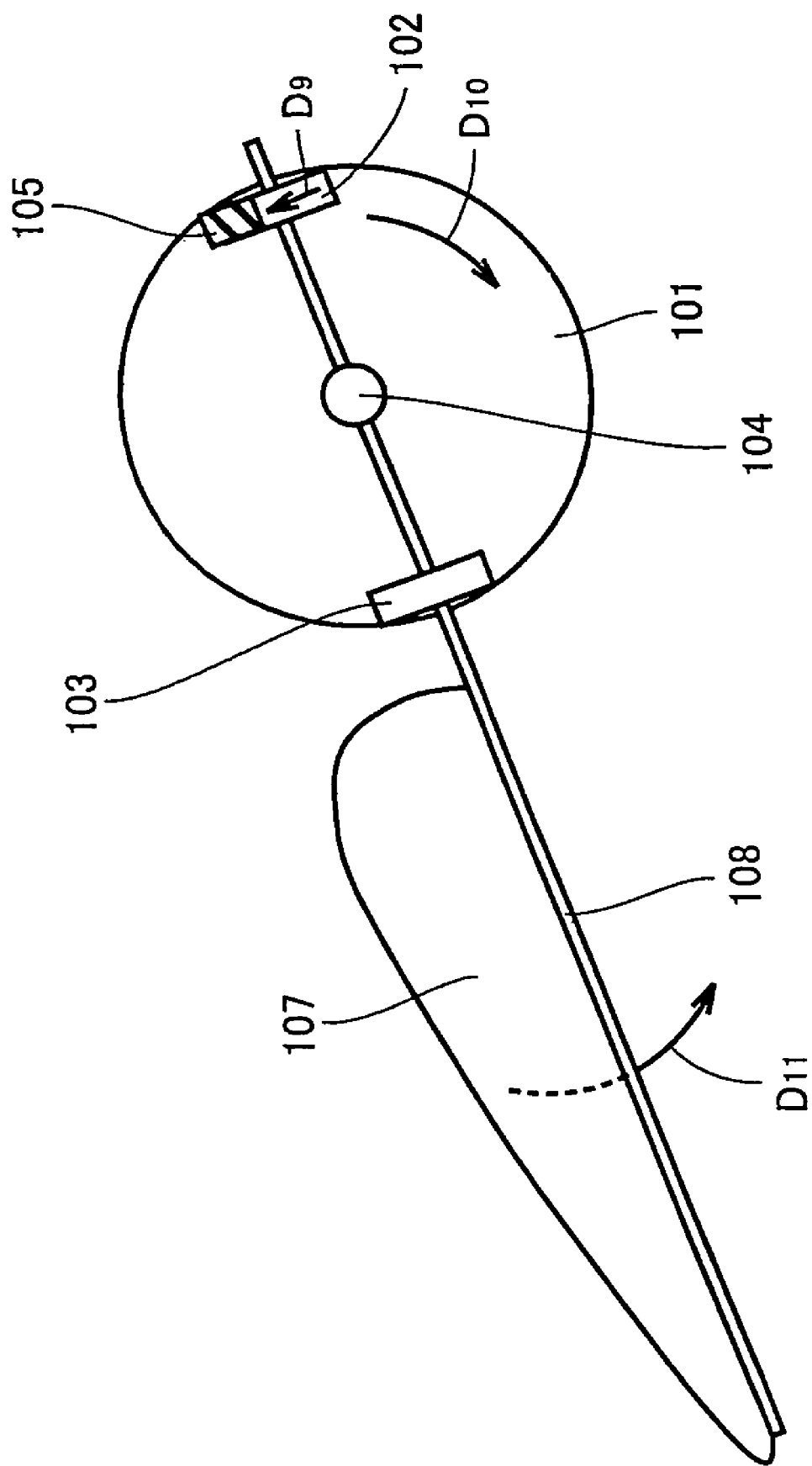

Assuming that the direction vertical to the sheet of paper corresponds to a vertically downward direction in FIGS. 8 to 11, the operation shown in FIG. 8 represents a wing twisting operation after an up stroke of the wing, FIG. 9 represents a down stroke of the wing, FIG. 10 shows a wing twisting operation after a down stroke, and FIG. 11 shows an up stroke of the wing.

Figure 12:
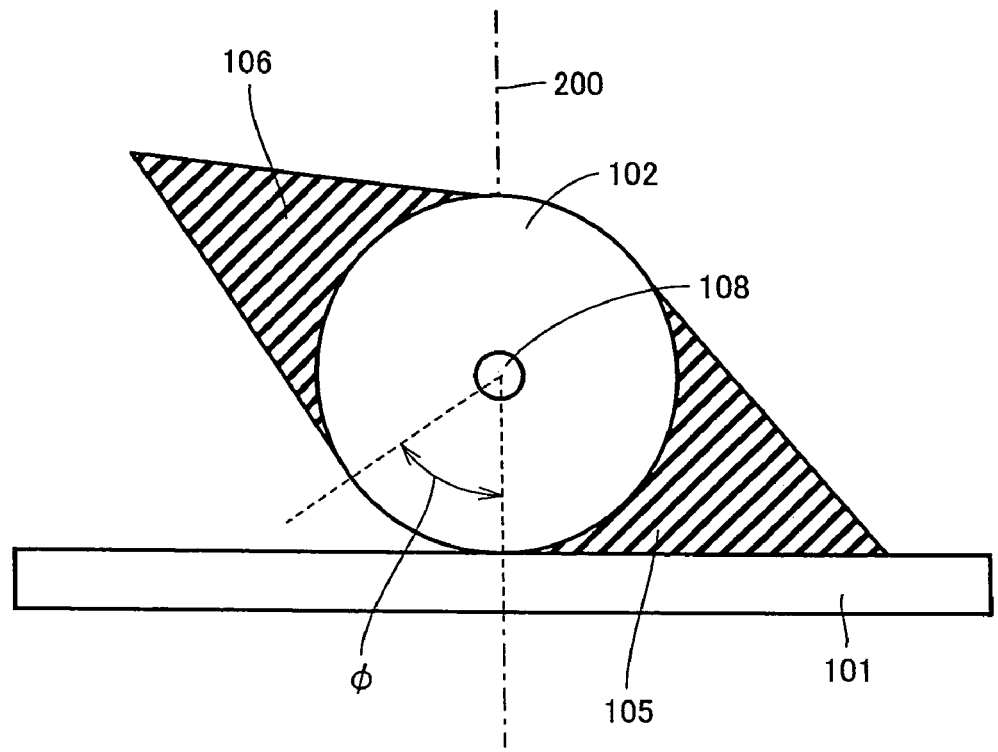
FIGS. 12 to 14 represent another exemplary shape of the mechanical portion of the flapping apparatus shown in FIGS. 1 to 3.

The shapes of the first and second stoppers 105 and 106 are not limited to those shown in FIGS. 1 to 11. The first and second stoppers may have any configuration that limits the rotation angle (torsion angle φ) of the second disk 102 within a prescribed range and enables rotation of wing shaft 108 caused only by the rotation of the first disk 101, with the relative positional relation between the first and second disks 101 and 102 fixed. By way of example, the first and second stoppers 105 and 106 may have larger areas of contact with the first disk 101 as shown in FIG. 12, than those described above.

Figure 13:
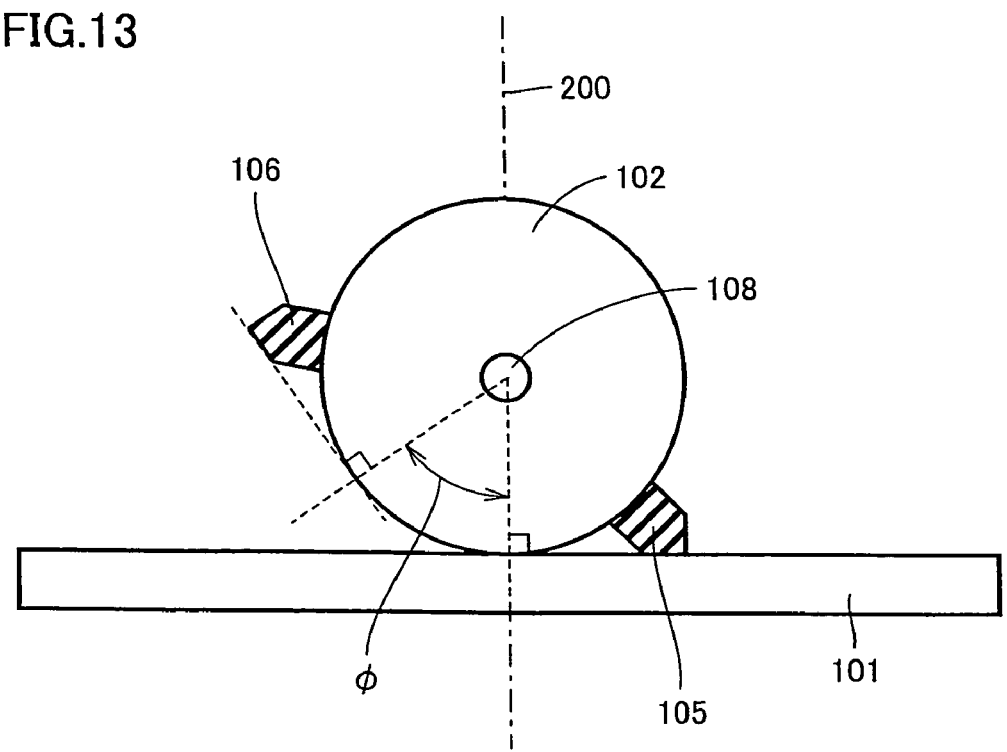
Figure 14:
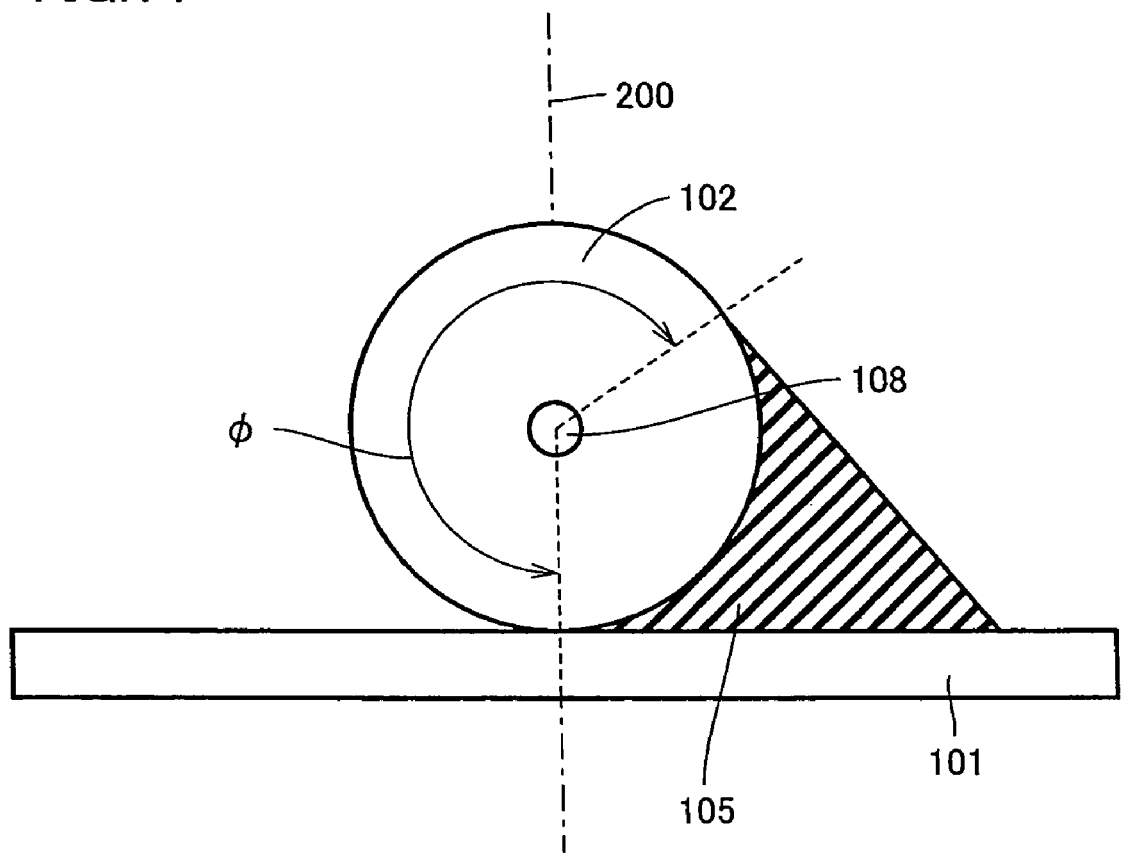

Alternatively, the first and second stoppers 105 and 106 may be projections as shown in FIG. 13. When a stopper is to be provided in a flapping mechanism having the torsion angle φ larger than a prescribed value, only the first stopper 105 may be provided on the second disk 102, as shown in FIG. 14.

Figure 15:
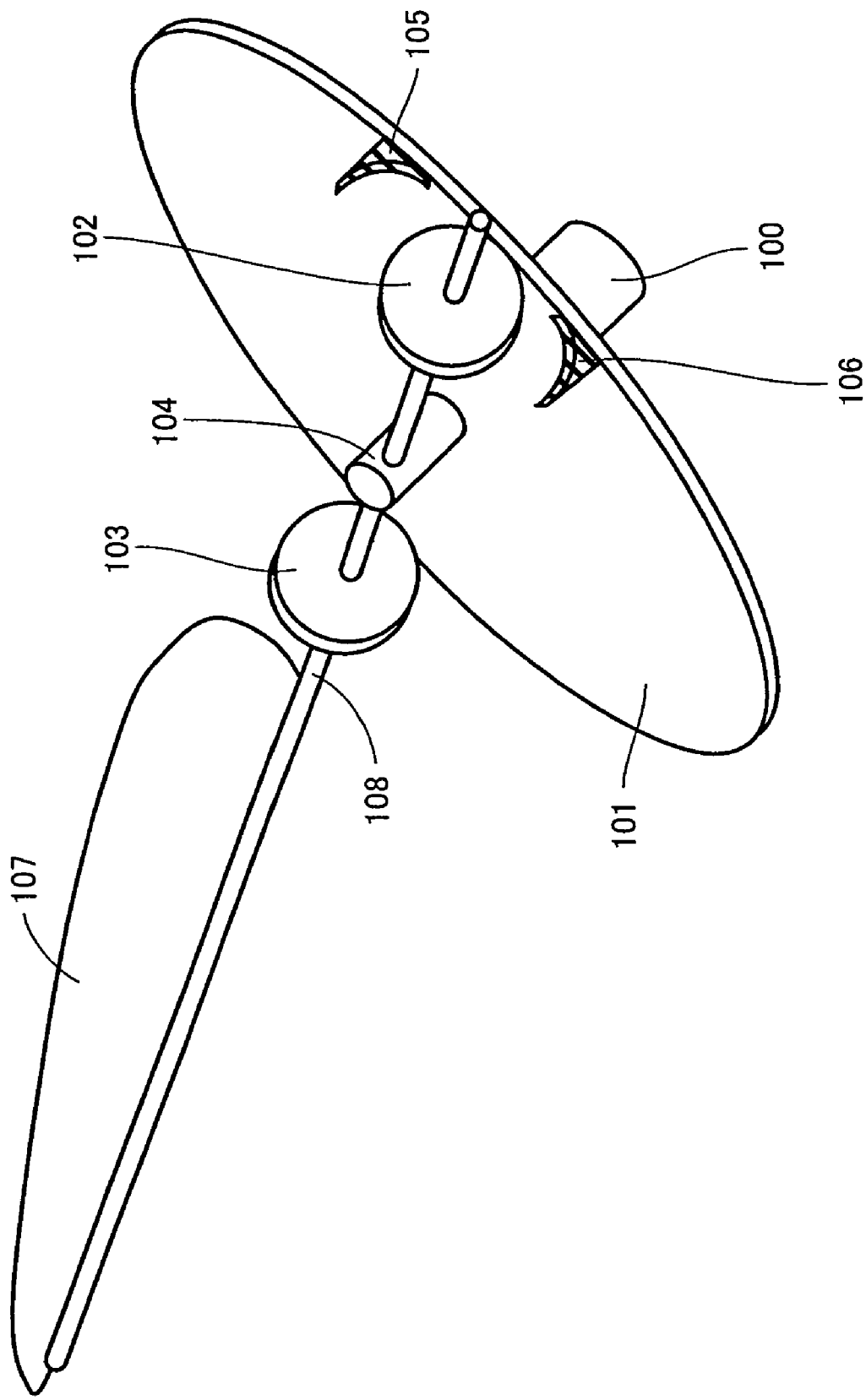
FIGS. 15 and 16 represent another example of the mechanical portion of the flapping apparatus shown in FIGS. 1 to 3.

Alternatively, the stopper may be fixed on the first disk 101, in place of the second disk 102, as shown in FIG. 15. In that case, it is preferred that larger frictional forces are generated at the contact surfaces between the second disk 102 and the first stopper 105 and between the second disk 102 and the second stopper 106, so as to prevent any slip at the contact surfaces. Further, the shapes of the stoppers are not limited to those described above, provided that similar effects as attained by the stoppers described above are ensured.

When the flapping mechanism is incorporated in a body of a flapping robot 500, it may possibly be arranged in robot body 500 with the central axis of rotation 200 of the first disk 101 inclined from the vertical direction. In that case, relative position of the first disk 101 to the second disk 102 may not be desirable. Further, for convenience of flight control, central axis of rotation 200 may be sometimes inclined intentionally from the vertical direction.

Even in a flapping robot having central axis of rotation 200 fixed in the vertical direction at the time of assembly, central axis of rotation 200 may undesirably be inclined from the vertical direction during flight as robot body 500 flies in various directions. Further, a large aerodynamic force or fluid force may be exerted on wing 107.

Because of the above described factors, a problem may possibly arise that the pressure acting on the contact surface between the second disk 102 and the first disk 101 vary considerably.

In order to avoid such a problem, a fourth disk 109 is provided that abuts the outer circumferential surface of the second disk 102 and presses the second disk 102 onto the first disk 101, as shown in FIG. 16. Naturally, the fourth disk 109 should not hinder the operation of second disk 102.

For this purpose, preferably, the fourth disk 109 is formed such that it freely rotates about the same axis of rotation as the central axis of rotation 200 of the first disk 101, along with the operation of the second disk 102. FIG. 16 shows an example of the fourth disk 109 formed by using a ball-bearing type rotating plate.

The ball-bearing type rotating plate includes ball-shaped bearings 109a, a recessed disk 109c having a columnar space formed therein, with the column having a circular bottom surface of which center is aligned with the center of the disk, and a protruded disk 109b having a columnar protrusion that fits the columnar space of the recessed disk 109c, as shown in FIG. 16. The protruded disk 109b is fixed on a shaft 110.

Recessed disk 109c and protruded disk 109b are fitted with each other to be in contact with bearings 109a that are arranged in a circle when viewed two-dimensionally. When the second disk 102 rotates, the recessed disk 109c rotates following the second disk 102, with the lower main surface being in contact with the second disk 102. At this time, bearings 109a are in rolling-contact with the inner side surface of the columnar space of recessed disk 109c and the outer side surface of the protruded portion of protruded disk 109b.

Protruded disk 109b is fixed on rotation shaft 110 connected to body 500, and hence, it does not rotate. As a result, the second disk 102 comes to rotate pressed with an almost constant pressing force against the main surface of the first disk 101. Therefore, even when a large fluid force acts on wing 107 during flight that might have possibly caused positional variation of the second disk 102, a state in which the first and second disks press against each other with a constant force is maintained, as it is pressed by the recessed disk 109c as a part of the fourth disk 109.

(Second Embodiment)

The flapping apparatus of the second embodiment will be described with reference to FIGS. 17 to 21.

The flapping apparatus in accordance with the present embodiment has almost the same structure as the flapping apparatus in accordance with the first embodiment except for the following points. Portions denoted by the same reference characters as in the first embodiment have the same functions as the flapping apparatus of the first embodiment, unless specified otherwise.

Flapping apparatus 1 of the present embodiment will be described, in relation to the present invention.

Flapping apparatus 1 in accordance with the present embodiment has, as shown in FIG. 17, a body 500 and a pair of wings 107 provided on the left and right sides with respect to the forward and backward directions on the body 500. The wings 107 of flapping apparatus 1 generate, by their motion, fluid force in the surrounding fluid. The fluid force can generate, on the flapping apparatus 1, a lift force larger than gravity of the flapping apparatus 1 in a direction opposite to the gravity of the flapping apparatus 1.

The flapping apparatus 1 includes a front wing shaft 807, as a first wing shaft, having one end fixed on wing 107 and the other end attached to body 500, for transmitting driving force of a driving source 1000 to the wing 107. The flapping apparatus 1 further includes a rear wing shaft 808, as a second wing shaft, having one end fixed on wing 107 and the other end attached to body 500, for transmitting driving force of driving source 1000 to wing 107.

Flapping apparatus 1 further includes a first disk 101 as a central point rotating member that rotates the front wing shaft 807 about a prescribed central point (central point of first disk 101) along a plane parallel to the plane xy including the left/right direction orthogonal to the forward and backward direction. Flapping apparatus 1 further includes a second disk 102 as a wing shaft rotating member that follows the rotation of the front wing shaft 807 about the prescribed central point without using any driving force from driving source 1000 and rotates the rear wing shaft 808 about a central axis of rotation 811 that crosses the front wing shaft 807 at a prescribed angle.

Wing 107 is provided spanning between the front and rear wing shafts 807 and 808, and the change in the positional relation between the front and rear wing shafts 807 and 808 forces the wing to be twisted.

Because of the above described structure, wing 107 is forcefully twisted, and therefore, it becomes possible to twist the wing positively in a flapping motion. Accordingly, it becomes easier for the flapping apparatus 1 to attain higher lift. Thus, a flapping apparatus 1 can be provided that can attain higher lift using only one driving source 1000 on each of the left and right wings 107.

The second disk 102 is a truncated cone, which is a portion of a first cone from which a second cone extending from the vertex of the first cone to a prescribed distance is removed. The truncated cone rotates with its circumferential surface being in contact with the main surface of the first disk 101, as the first disk 101 rotates. Rear wing shaft 808 is provided on a circular bottom surface of the second disk 102 having the shape of the truncated cone. Further, the axis of rotation 811 passing through the center of the circular bottom surface of the second disk 102 having the shape of a truncated cone forms a prescribed angle α with the rear wing shaft 808.

Because of the structure described above, it becomes possible to form the central point rotating member and the wing shaft rotating member of the present invention using members that can be formed relatively easily, that is, the first disk 101 and the second disk having the shape of a truncated cone.

Further, the main surface of the first disk 101 and the outer circumferential surface of the second disk 102 having the shape of a truncated cone may have recesses and protrusions that mate with each other. By this provision, undesirable deviation in positional relation between the main surface of the first disk 101 and the outer circumferential surface of the second disk 102 caused by a factor other than the movement of the second disk 102 derived from the rotation of the second disk 102 can surely be prevented.

The flapping apparatus 1 further includes first and second stoppers 105 and 106 limiting the range of rotation of the second disk 102 so that the rotation angle of the rear wing shaft 808 is within a prescribed range. When either one of the first and second stoppers 105 and 106 is functioning, the second disk 102 has its positional relation relative to the first disk 101 fixed, and therefore, the front and rear wing shafts 807, 808, the second disk 102 and support shaft 104 rotates together with first disk 101. When the first and second stoppers 105, 106 are not functioning, the second disk 102 rotates as the first disk 101 rotates, and therefore, the rotation about central axis 811 of the rear wing shaft 808 is caused by the rotation of the second disk 102.

Because of the structure described above, it becomes possible to realize a complicated three-dimensional locus of wing 107 necessary for flapping flight and hovering, simply by providing one driving source 1000 having one degree of freedom on one wing 107.

Preferably, the stopper is provided on at least one of the first and second disks 101 and 102. Thus, it becomes possible to realize a complicated three-dimensional locus of the wing necessary for flapping flight and hovering, by the first and second disks 101, 102 having simple structures.

The first and second stoppers 105 and 106 stop the rotation about central axis 811 of the second disk 102 as it abuts either one of the first and second disks 101 and 102. The coefficient of friction of the first and second stoppers 105, 106 and the coefficient of friction of either one of the first and second disks 101, 102 is set such that positional relation between the first stopper 105 or the second stopper 106 and one of the first and second disks 101 and 102 does not change while the first stopper 105 or the second stopper 106 is in abutment with either the first disk 101 or the second disk 102.

Because of the above described structure, undesirable change in the positional relation between the first and second disks 101 and 102 can be prevented.

The flapping apparatus 1 further includes a wing edge 810 having a flexible wire provided to connect a tip end of the front wing shaft 807 and a tip end of the rear wing shaft 808. Wing 107 is formed at a portion surrounded by front wing shaft 807, rear wing shaft 808 and wing edge 810.

Wing edge 810 is formed of a member having such flexibility that does not cause plastic deformation when the relative positional relation between the front and rear wing shafts 807 and 808 changes. This prevents damage to the wing edge 810 caused by continuous flapping flight.

Front and rear wing shafts 807 and 808 are formed by hollow cylindrical members, and wing edge 810 may be inserted to each of the hollow portions of the cylindrical members. Wing edge 810 can rotate in each of the hollow portions, about each of axes extending in the directions of extension of each of the front and rear wing shafts 807 and 808, and the wing edge 810 is provided not to come off from the front and rear wing shafts 807 and 808. Because of this provision, wing edge 810 is twisted not restricted by the front and rear wing shafts 807 and 808 during flapping flight, and hence, damage to wing edge 810 caused by continuous flapping flight can be prevented.

Details of flapping apparatus 1 in accordance with the present embodiment will be described in the following.

Figure 18:
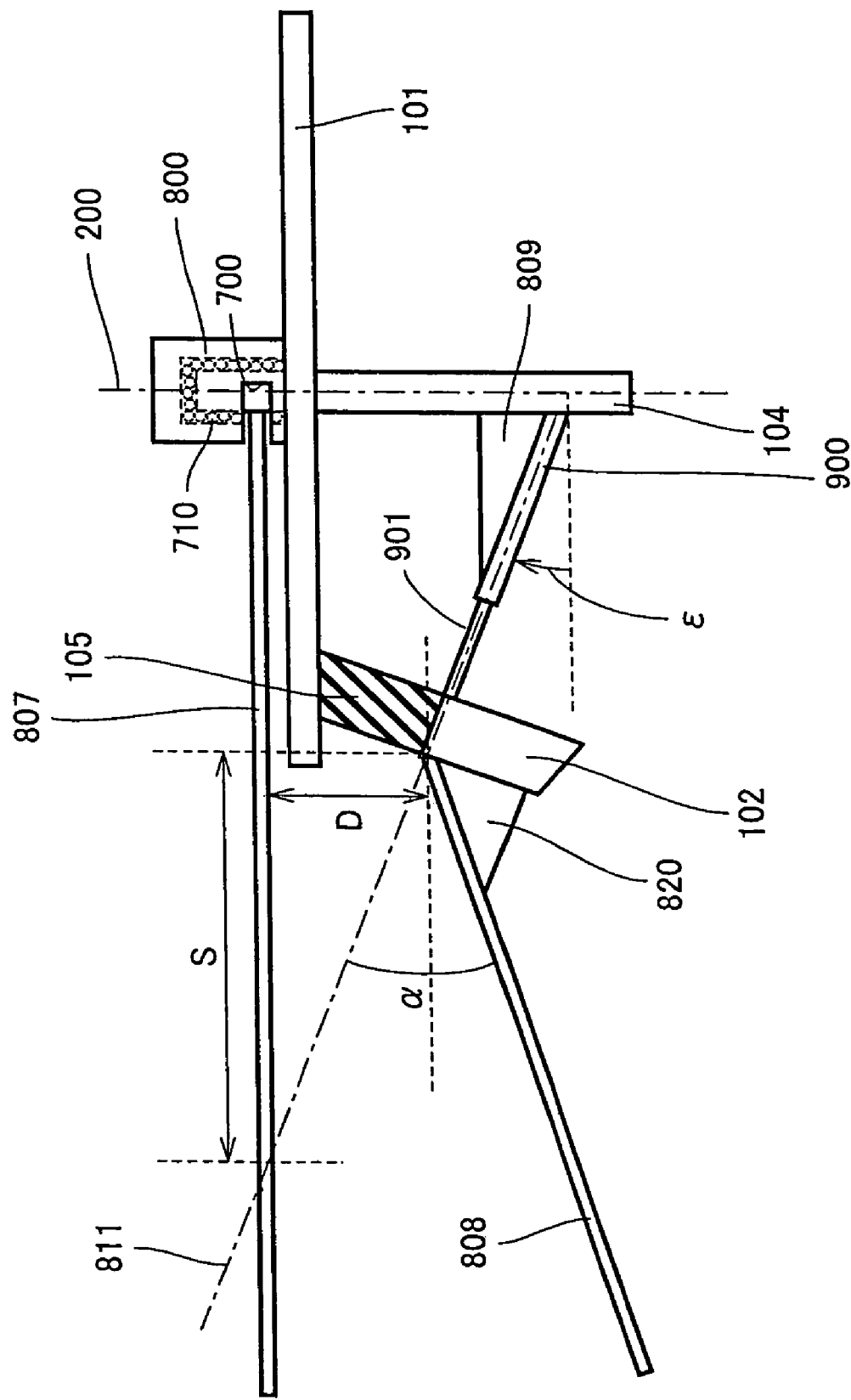
FIG. 18 represents a mechanical portion for flapping of the flapping apparatus of the second embodiment.

FIG. 18 shows the flapping mechanism of the flapping apparatus in accordance with the second embodiment of the present invention. In the flapping mechanism of the present embodiment, the central axis 811 of rotation (twisting axis) of the second disk 102 is not parallel to the main surface of the first disk 101. In FIG. 18, the angle formed by the twisting axis and the main surface of the first disk 101 is represented by $\epsilon$.

The wing shafts consist of a front wing shaft 807 and a rear wing shaft 808. Front wing shaft 807 does not rotate about an axis in the direction of extension of the shaft. Front wing shaft 807 is fixed to a support shaft 104. Support shaft 104 is inserted into a concave potion of transmission shaft 800. There are some ball bearings 710 between an outer circumferential surface of support shaft 104 and an inner circumferential surface of transmission shaft 800 (a surface of the concave). Support shaft 104 rotates in the concave of transmission shaft 800, being in contact with ball bearings 710, independent from transmission shaft 800. In short, the rotation of transmission shaft 800 is not caused by the rotation of support shaft 104. Front wing shaft 807 is movable in the forward and backward direction in an opening 700 provided at a sidewall of transmission shaft 800. Transmission shaft 800 is a shaft to which the rotation of driving source 1000 is not propagated directly. However, the rotation of driving source 1000 can be indirectly propagated to transmission shaft 800 through the first disk 101, the second disk 102 and stopper 105 or 106 because transmission shaft 800 is fixed to the first disk 101. Therefore, when the first and second stoppers 105 and 106 are not in abutment with the first disk 101, front wing shaft 807, the second disk 102 and rear wing shaft 808 move in the forward and backward direction, together with support shaft 104, by rotation of support shaft 104 and the second disk 102 and rear wing shaft 808 rotate about an central axis of rotation (twisting) 811 with the second disk 102 being contact with the first disk 101.

When either one of the first and second stoppers 105 and 106 is in abutment with the first disk 101, front wing shaft 807 rotates only about the central axis of rotation 200 of the first disk 101, with relative positional relation with the first disk 101 being fixed, as the first disk 101 and support shaft 104 rotates.

A front wing shaft reinforcing plate 809 is provided for reinforcing a root of a twisting shaft 900. Twisting shaft 900 is a hollow cylinder, fixed on support shaft 104. At the central point of the circular surface of the second disk 102, an insertion shaft 901 is fixed. Insertion shaft 901 is inserted to the hollow portion of twisting shaft 900. Therefore, when the second disk 102 rotates, insertion shaft 901 is not restricted by twisting shaft 900 and is capable of rotating about the axis of rotation 811. Insertion shaft 901 has an engaging portion at its tip end and engaged with support shaft 104, so that it does not come off from twisting shaft 900.

Rear wing shaft 808 is provided to form a prescribed angle with the axis of rotation 811. Further, rear wing shaft 808 is fixed on the second disk 102 by means of a rear wing shaft reinforcing plate 820, and rotates as the second disk 102 rotates. The first and second stoppers 105 and 106 have almost the same function as the stoppers 105,106 described in the first embodiment. In flapping apparatus 1 of the present embodiment, the first and second stoppers 105 and 106 will be described as examples. It is noted, however, that any of the stoppers described in the first embodiment may be used.

The rotation (torsion, twisting) angle φ of wing 107 in the flapping mechanism of the first embodiment is generated by the rotation about the wing shaft 108. In contrast, rotation (torsion or twisting) angle φ of wing 107 in the flapping mechanism of the present embodiment is generated by the rear wing shaft 808 rotating around the front wing shaft 807. This is the difference of the flapping mechanism of the present embodiment from the flapping mechanism of the first embodiment.

In the flapping mechanism of the first embodiment, wing 107 passively deforms as it receives force from surrounding fluid, such as air, while it is impossible to positively deform wing 107. In the present embodiment, however, it is possible to positively deform wing 107 by the operation of the flapping mechanism.

As will be described later, the tip end portion of wing 107 rotates larger than the rotation angle (torsion angle) φ of the second disk 102, that is, the tip end portion of wing 107 is twisted larger than the root portion of wing 107. Therefore, in flapping apparatus 1 of the present embodiment, the angular speed of rotation (twisting) at the tip end portion of wing 107 becomes faster than the angular speed of rotation (twisting) at the root of the wing. As a result, it is possible for the flapping mechanism of the present embodiment to generate larger rotational lift than the flapping mechanism of the first embodiment.

It is noted, however, that the following structure is preferred as the wing 107 is twisted. A configuration of the flapping mechanism that can cope with the twisting of wing 107 will be described with reference to FIGS. 19 and 20.

Figure 19:
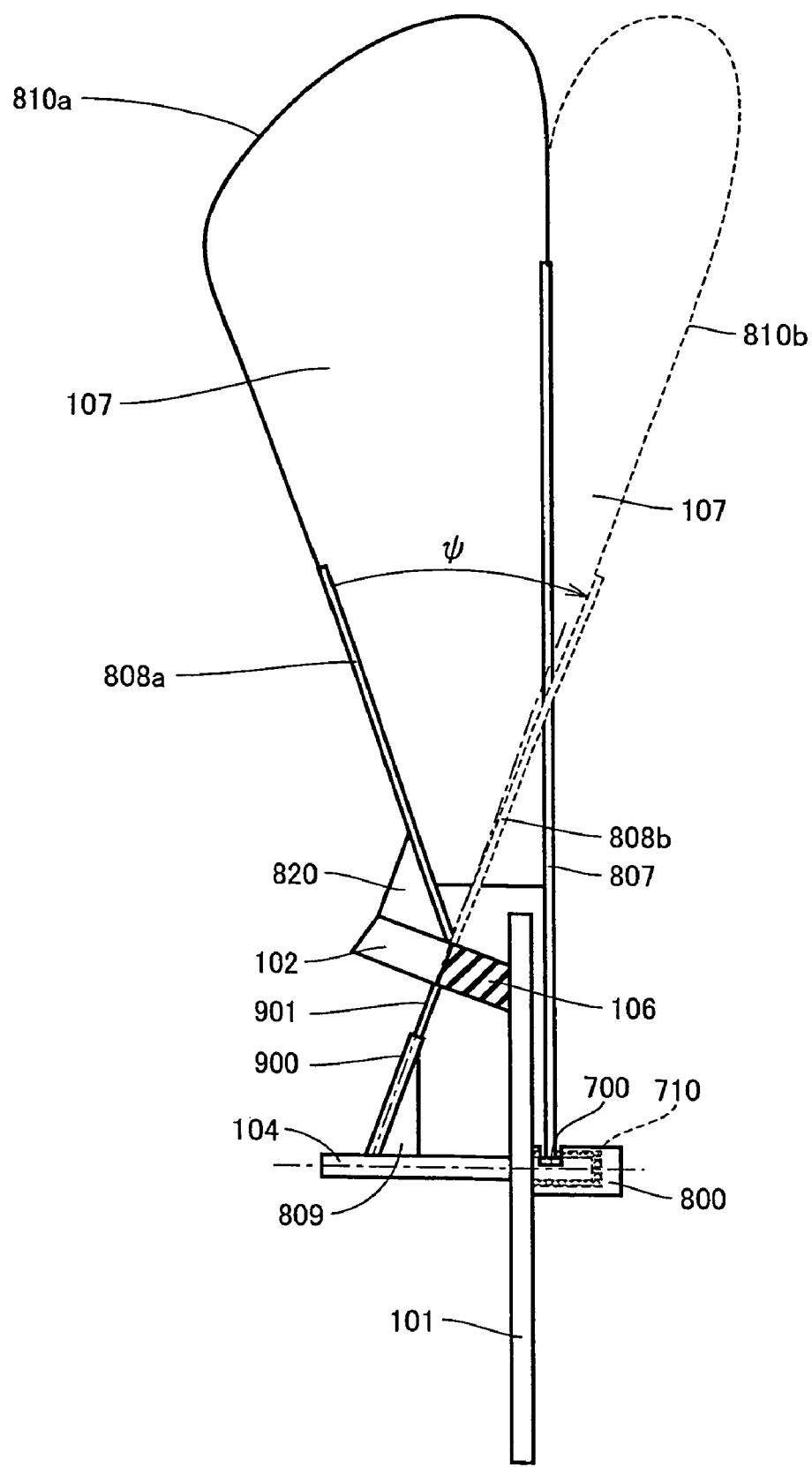
FIG. 19 is an enlarged view of the mechanical portion for flapping of the flapping apparatus in accordance with the second embodiment.
Figure 20:
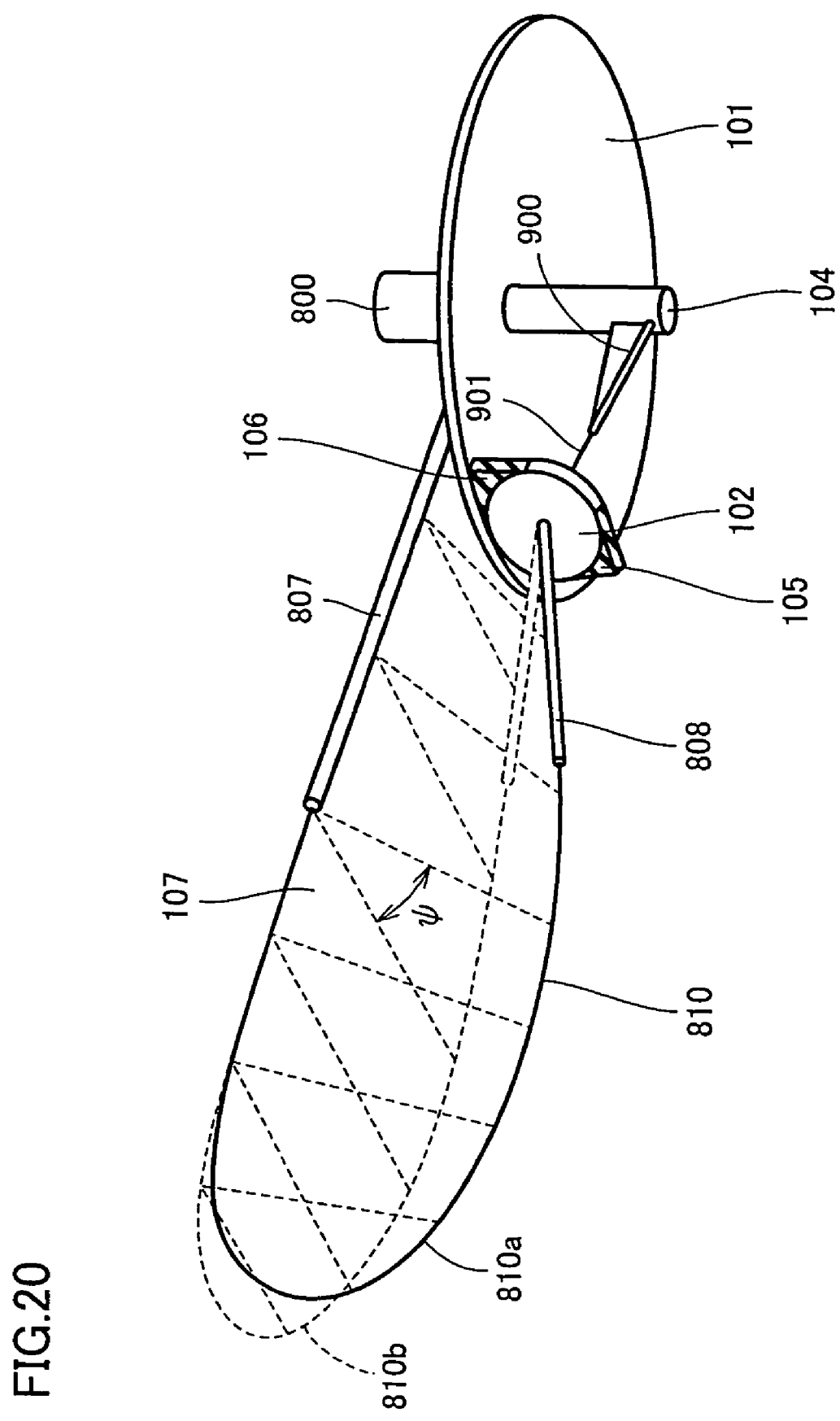
FIG. 20 shows the movement of the wing in the flapping apparatus in accordance with the second embodiment.

Referring to FIGS. 19 and 20, wing 107 is provided with a wing edge 810 that connects front wing shaft 807 and rear wing shaft 808. A material softer than that for front and rear wing shafts 807 and 808 is used for wing edge 810. Specific example of the material for wing edge 810 includes a wire. FIGS. 19 and 20 show the wing 107 before and after twisting, in which the state 810a before twisting is given by a solid line and the state 810b after twisting is given by a dotted line.

In the flapping mechanism shown in FIGS. 19 and 20, wing edge 810 can freely rotate about each of the axes in the directions of extension of front wing shaft 807 and rear wing shaft 808. Wing shafts 807 and 808 are formed by hollow cylindrical members, and wing edge 810 is inserted to the hollow portion of the cylindrical member. In each of the hollow portions, wing edge 810 is rotatable about each of the axes in the directions of extension of each of front wing shaft 807 and rear wing shaft 808. Further, wing edge 810 has, by way of example, a ball-shaped stopper at its tip end, and as the stopper is engaged with the root portions of front wing shaft 807 and rear wing shaft 808, coming off of the wing edge 810 from the front and rear wing shafts 807 and 808 is prevented. Wing edge 810 itself may be formed by a member that has such a torsional resilience that allows easy twisting of the edge about each of the axes of front and rear wing shafts 807 and 808. Wing 107 is naturally formed of a flexible film that can follow the deformation of wing edge 810. Thus, load imposed on wing 107 when it is twisted can be alleviated, and hence, damages including buckling can be prevented.

The angle of rotation (twisting angle) φ of wing 107 itself shown in FIG. 20 is the angle between inclination of the wing chord (chord of blade) before the wing is twisted and the inclination of the wing chord after the wing is twisted and defined as follows $$\tan \phi = \cos \eta \cdot \sin \phi / \{\cos(\epsilon-\eta) \cdot [\tan(\epsilon-\eta)/\tan \epsilon - 1/n]\}$$

Here, n represents distance of a point on wing shaft 807 from the root of front wing shaft 807 with the distance S shown in FIG. 18 being 1, and ε represents an angle showing the inclination of twisting axis 811 shown in FIG. 18. The distance S represents the distance from an intersection between a vertical line drawn from the central point of the circular surface of the second disk 102 to the front wing shaft 807 and the front wing shaft 807 to an intersection between an extension of twisting shaft 900 (a central axis 811) and the front wing shaft 807. Further, η is given by the following equation.

$$\tan \eta = \tan \epsilon \cdot \cos \phi$$

Further, as described above, the rotational angle φ of rear wing shaft 808 of the flapping mechanism in accordance with the present embodiment is generated as the rear wing shaft 808 rotates about the front wing shaft 807. Specifically, the ( angular angle φ of rear wing shaft 808 is represented by the angle of rotation φ of the second disk 102.

The direction of wing chord is vertical to the front wing shaft 807, as represented by the dotted line in FIG. 20. In FIG. 20, angle between the inclination of wing chord before the wing 107 is twisted and inclination of wing chord after the wing 107 is twisted gradually becomes larger from the root to the tip end of wing 107.

Figure 21:
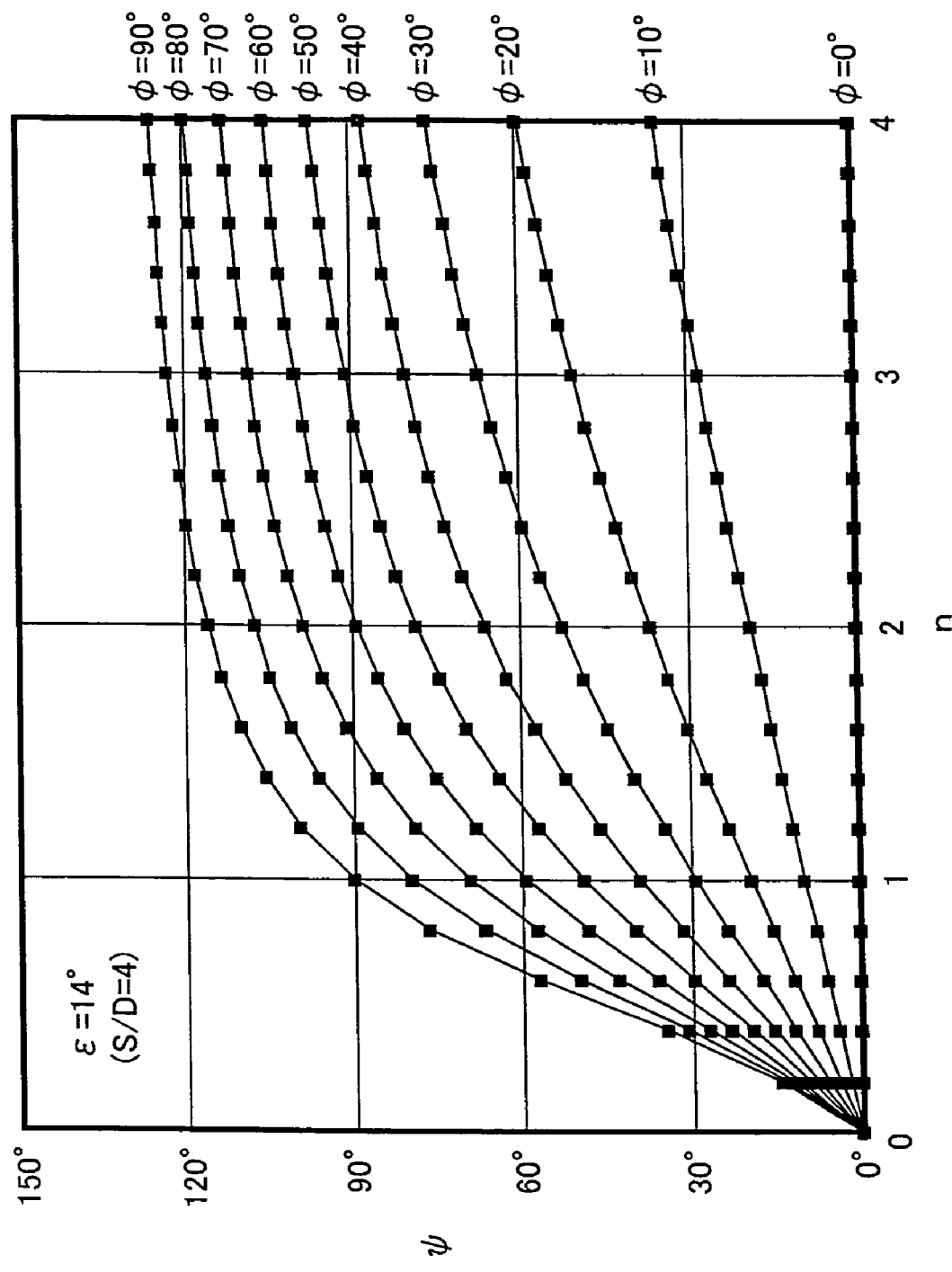
FIG. 21 is a graph representing the relation between the torsion angle $\phi$ of the wing and an angle of rotation $\varphi$ of the second disk in accordance with the second embodiment.

FIG. 21 shows the torsion angle φ of the wing chord at a position on front wing shaft 807 at a distance n from the root, when the flapping mechanism is designed with ε=14° (S/D=4). When the angle of rotation φ of the second disk 102 is φ=30°, the angle φ at the position of n=2 is φ=53°. When the second disk 102 is rotated to attain the angle φ=90°, the angle φ at the position of n=2 is φ=116°.

As described above, according to the flapping mechanism of the present embodiment, the torsion angle φ of the wing chord becomes larger than the angle of rotation (twisting angle) φ of the second disk 102, and it becomes gradually larger from the root to the tip end portion of wing 107. As a result, the flapping mechanism in accordance with the present embodiment is more advantageous than the flapping mechanism in accordance with the first embodiment.

Flight control in the first and second embodiments will be described in the following.

In order to move high and low (everywhere) in a three-dimensional space by flapping flight, it is necessary to realize three motion elements, that is, forward/backward movement, left/right turn, and upward/downward movement. In the following, a method of controlling flight that realizes each of the motion elements and hovering as a basic operation therefore will be described.

In the embodiments, the flapping apparatus 1 hovers when the actuator as the driving source 1000 rotates wing shaft 108 or the front wing shaft 807 with the amplitude of ±45°, forward and backward with respect to the center of amplitude, with the center of amplitude of rotation of the left and right first disks 101 being almost abeam with the flapping apparatus 1. Specifically, when the left and right wings 107 make reciprocating motion in the forward and backward directions such that the line connecting the center of amplitude of rotation of the left first disk 101 and the tip end of the wing shaft 108 of the left wing 107 or front wing shaft 807 of the left wing shaft and the line connecting the center of amplitude of rotation of the right first disk 101 and the tip end of the wing shaft 108 of the right wing 107 or the tip end of front wing shaft 807 of the right wing 107 are approximately aligned, the flapping apparatus 1 hovers.

As the wing 107 rotates by ±45° in the forward and backward directions as described above, fluid force from the side of the first disk 101 to the tip end of wing 107 acts on the wing 107 in the direction of extension of wing shaft 108 or front wing shaft 807, in addition to the vertically downward flow. By utilizing this flow, it is possible to move flapping apparatus 1 in the forward and backward directions.

For instance, when the center of amplitude of rotation of the first disk 101 is shifted to the front or rear side by using the actuator as the driving source 1000, the flapping motion that is the reciprocating motion of wing 107 in the forward and backward directions is shifted to the front or rear side. Accordingly, it becomes possible to direct the flow from the side of the first disk 101 to the tip end of wing 107 in the direction of extension of wing shaft 108 or front wing shaft 807 to be in front of or behind the flapping apparatus 1. Thus, flapping apparatus 1 can obtain a forward force a or backward force. When the manner of flapping is changed such that flow from the root to the tip end of the wing 107 is directed backward both for the left and right wings 107, flapping apparatus 1 moves forward. When the manner of flapping is changed such that the flow from the side of the root to the tip end of wing 107 along the direction of extension of wing shaft 108 or front wing shaft 807 to the front side of flapping apparatus 1 both for the left and right wings 107, flapping apparatus can move backward.

By using a flow from the side of the first disk 101 to the tip end of wing 107 along the direction of extension of wing shaft 108 or front wing shaft 807 on the surface of wing 107, flapping apparatus 1 can be turned to the left or right.

By way of example, when the flow from the side of the first disk 101 to the tip end of wing 107 along the direction of extension of wing shaft 108 or front wing shaft 807 is directed backward only for the left wing 107, flapping apparatus moves forward while making a right turn. On the contrary, when the flow from the side of the first disk 101 to the tip end of wing 107 along the direction of extension of wing shaft 108 or front wing shaft 807 is directed backward only for the right wing 107, flapping apparatus 1 moves forward while making a left turn.

When the flow from the side of the first disk 101 to the tip end of wing 107 along the direction of extension of wing shaft 108 or front wing shaft 807 is directed forward only for the right wing 107 and the flow from the side of the first disk 101 to the tip end of wing 107 along the direction of extension of wing shaft 108 or front wing shaft 807 is directed backward only for the right wing 107, flapping apparatus 1 rotates counterclockwise when viewed from above, at that point.

(Upward and Downward Movement)

The simplest method of realizing upward and downward movement is to change the speed of rotation of the first disk 101, so as to increase or decrease the flapping frequency of the wing 107.

Other than the method above, a method of increasing or decreasing flapping stroke (amplitude) of wing 107, that is, the method of increasing or decreasing the amplitude of rotation in the forward and backward directions of wing shaft 108 or front wing shaft 807 derived from the rotation of the first disk 101 may be possible as the method of realizing upward and downward movements.

In the flapping apparatus in accordance with the first and second embodiments described above, preferably, driving source 1000 functions as an amplitude center moving mechanism that can move the center of amplitude of rotation of the first disk 101, which causes reciprocating motion of wing shaft 108 (front wing shaft 807) in the forward and backward directions. For instance, when driving source 1000 changes the range of reciprocating motion while not changing the magnitude of reciprocating rotational motion, the center of amplitude of reciprocating motion in the forward and backward directions of the wing shaft 108 (807 front wing shaft) is changed. In this manner, it becomes possible for flapping apparatus 1 not only to hover but also to move readily to any of forward, backward, left and right directions.

Further, in flapping apparatus 1 of the embodiments, desirably, the amplitude center moving mechanism is capable of moving the center of amplitude of rotation of the first disk 101 while the first disk 101 is causing reciprocating rotational motion of wing shaft 108 or front wing shaft 807. For instance, when the magnitude of amplitude of rotation of driving source 1000 is maintained and the range of rotation of driving source 1000 is changed while driving source 1000 is rotated, it becomes possible to quickly change the manner of flight of flapping apparatus 1.

Such a quick change in the manner of flight may be possible in a flapping apparatus 1 that includes a mechanism provided outside the driving source 1000 for changing relative positional relation between driving source 1000 and body 500 in order to change the magnitude of rotation of driving source 1000, and the range of rotation of driving source 1000 is changed relative to body 500 by the mechanism.

In the present specification, the term "rotation" encompasses a turning motion that a prescribed point reciprocates in a prescribed range of rotation angle while drawing a prescribed arcuate locus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flapping apparatus having a body and a pair of wing portions provided on left and right sides of the body with respect to forward and backward directions, wherein said wing portions generate, by their motions, fluid force on surrounding fluid, said fluid force can generate, on said flapping apparatus, a lift force larger than gravity of said flapping apparatus in a direction opposite to the gravity of said flapping apparatus;

said flapping apparatus comprising, for at least one of said wing portions:

a first wing shaft having one end fixed on said wing portion and the other end attached to said body, for transmitting driving force of a driving source to the wing portion;

a second wing shaft having one end fixed on said wing portion and the other end attached to said body, for transmitting driving force of a driving source to said wing portion;

a central point rotating member capable of rotating said first wing shaft about a prescribed central point along a plane parallel to the forward and backward direction and to the left and right direction orthogonal to the forward and backward direction; and a wing shaft rotating member that follows the rotation of the said first wing shaft about the prescribed central point without using any driving source from a driving force and rotates said second wing shaft about a central axis of rotation crossing said first wing shaft at a prescribed angle; wherein said wing portion is provided spanning between said first and second wing shafts, and change in the positional relation between said first and second wing shafts forces said wing portion to be twisted.

2. The flapping apparatus according to claim 1, wherein said central point rotating member includes a disk;

said wing shaft rotating member includes a truncated cone that is a portion of a first cone from which a second cone extending from the vertex of the first cone to a prescribed distance is removed;

said truncated cone rotates as said disk rotates, with a circumferential surface being in contact with the main surface of said disk;

said second wing shaft is provided on a circular surface of said truncated cone; and an axis passing through the center of the circular surface of said truncated cone forms a prescribed angle with said second wing shaft.

3. The flapping apparatus according to claim 2, wherein the main surface of said disk and the outer circumferential surface of said truncated cone have recesses and protrusions that mate with each other.

4. The flapping apparatus according to claim 1, further comprising:

a stopper limiting range of rotation of said wing shaft rotating member so that rotation angle of said second wing shaft is within a prescribed range; wherein said wing shaft rotating member has its positional relation relative to said central point rotating member fixed when the stopper is functioning, so that rotation of said first and second wing shafts is caused by the rotation of said central point rotating member; and said wing shaft rotating member rotates as said central point rotating member rotates when the stopper is not functioning, so that rotation of said second wing shaft is caused by the rotation of said wing shaft rotating member.

5. The flapping apparatus according to claim 4, wherein said stopper is provided on at least one of said central point rotating member and said wing shaft rotating member.

6. The flapping apparatus according to claim 4, wherein said stopper abuts either one of said wing shaft rotating member and said central point rotating member to stop rotation of said wing shaft rotating member; and coefficient of friction of said stopper and coefficient of friction of either one of said central point rotating member and said wing shaft rotating member is set such that positional relation between said stopper and one of said central point rotating member and said wing shaft rotating member does not change while said stopper is in abutment with either said central point rotating member or said wing shaft rotating member.

7. The flapping apparatus according to claim 1, further comprising a wing edge having a flexible wire provided to connect a tip end of said first wing shaft and a tip end of said second wing shaft; wherein said wing portion is formed at a portion surrounded by said first wing shaft, said second wing shaft and said wing edge.

8. The flapping apparatus according to claim 7, wherein said wing edge is formed of a member having such flexibility that does not cause plastic deformation when relative positional relation between said first and second wing shafts changes.

9. The flapping apparatus according to claim 7, wherein said first and second wing shafts are formed by hollow cylindrical members; and said wing edge is inserted into each of the hollow portions of said cylindrical members, rotatable about each of axes extending in the directions of extension of each of the first and second wing shafts in each of the hollow portions, and provided not to come off from each of said first and second wing shafts.

* * * * *

UNITED STATES PATENT AND TRADEMARK OFFICE
CERTIFICATE OF CORRECTION

| | | |
|---|---|---|
| PATENT NO. | : 7,195,199 B2 | Page 1 of 1 |
| APPLICATION NO. | : 11/107064 | |
| DATED | : March 27, 2007 | |
| INVENTOR(S) | : Yoshiji Ohta et al. | |

It is certified that error appears in the above-identified patent and that said Letters Patent is hereby corrected as shown below:

On the last page at Column 19, lines 8 and 9 in the section designated "What is claimed is:" please delete the words:

"driving source from a driving force"

and replace them with the following:

-- driving force from a driving source --.

Signed and Sealed this

Seventh Day of August, 2007

JON W. DUDAS
*Director of the United States Patent and Trademark Office*